US007902525B2

(12) United States Patent
Akselrod et al.

(10) Patent No.: US 7,902,525 B2
(45) Date of Patent: Mar. 8, 2011

(54) METHOD OF LUMINESCENT SOLID STATE DOSIMETRY OF MIXED RADIATIONS

(75) Inventors: Mark S. Akselrod, Stillwater, OK (US); Garrett J. Sykora, Stillwater, OK (US)

(73) Assignee: Landauer, Inc., Glenwood, IL (US)

( * ) Notice: Subject to any disclaimer, the term of this patent is extended or adjusted under 35 U.S.C. 154(b) by 173 days.

(21) Appl. No.: 12/258,035

(22) Filed: Oct. 24, 2008

(65) Prior Publication Data

US 2010/0102249 A1    Apr. 29, 2010

(51) Int. Cl.
*G01J 1/58* (2006.01)
(52) U.S. Cl. .................................. 250/459.1; 250/483.1
(58) Field of Classification Search ............... 250/458.1, 250/459.1, 483.1, 484.5
See application file for complete search history.

(56) References Cited

U.S. PATENT DOCUMENTS

| | | | |
|---|---|---|---|
| 3,508,208 A | 4/1970 | Duguay et al. |
| 4,041,476 A | 8/1977 | Swainson |
| 4,471,470 A | 9/1984 | Swainson et al. |
| 4,638,163 A | 1/1987 | Braunlich et al. |
| 4,825,084 A | 4/1989 | Braunlich et al. |
| 4,839,518 A | 6/1989 | Braunlich et al. |
| 5,015,855 A | 5/1991 | Braunlich et al. |
| 5,057,693 A | 10/1991 | Burgkhardt et al. |
| 5,289,407 A | 2/1994 | Strickler et al. |
| 5,319,210 A | 6/1994 | Moscovitch |
| 5,325,324 A | 6/1994 | Rentzepis et al. |
| 5,498,876 A | 3/1996 | Moscovitch |
| 6,140,651 A | 10/2000 | Justus et al. |
| 6,316,782 B1 | 11/2001 | Akselrod et al. |
| 6,514,277 B1 | 2/2003 | Lilge et al. |
| 6,846,434 B2 | 1/2005 | Akselrod |
| 7,141,804 B1 | 11/2006 | Akselrod et al. |
| 2007/0272862 A1 | 11/2007 | Desbrandes et al. |

OTHER PUBLICATIONS

Benton, et al., Proton Recoil Neutron Dosimeter for Personnel Monitoring, Health Phys., 40, pp. 801-809 (1981).
Piesch, et al., "Albedo Dosimetry System for Routine Personnel Monitoring," Radiat. Prot. Dosim, 23 (1/4), pp. 117-120 (1988).
d'Errico, "Radiation Dosimetry and Spectrometry with Superheated Emulsions," Nuclear Instr., Meth. B, 184, pp. 229-254 (2001).
Moscovitch, et al., "Radiation Dosimetry Using Three-Dimensional Optical Random Access Memories," Nucl, Inst. Meth. Phys. Res. vol. 184 (2001), pp. 207-218.
D.A. Parthenopoulos and P.M. Rentzepis, Three-Dimensional Optical Storage Memory, Science, vol. 245, pp. 843-845. Aug. 1989.
Confocal and two-photon microscopy: Foundations, applications, and advances. Edited by A. Diaspro,Wiley-Liss New-Yrok, pp. 19-38, 2002.
International Search Report and Written Opinion dated Feb. 26, 2010 in PCT Application No. PCT/US2009/061587.

*Primary Examiner* — David P Porta
*Assistant Examiner* — Mark R Gaworecki
(74) *Attorney, Agent, or Firm* — Vedder Price P.C.; Ajay A. Jagtiani

(57) ABSTRACT

A method of determining the doses of neutrons, gamma and X-ray photons, beta, alpha and other ionizing radiations using a method of image processing in spatial and frequency domain that produces parameters that are related to the radiation dose absorbed in a luminescent material. Portions of the luminescent material may be covered by different converters to allow for doses of different radiations to be discriminated.

39 Claims, 12 Drawing Sheets

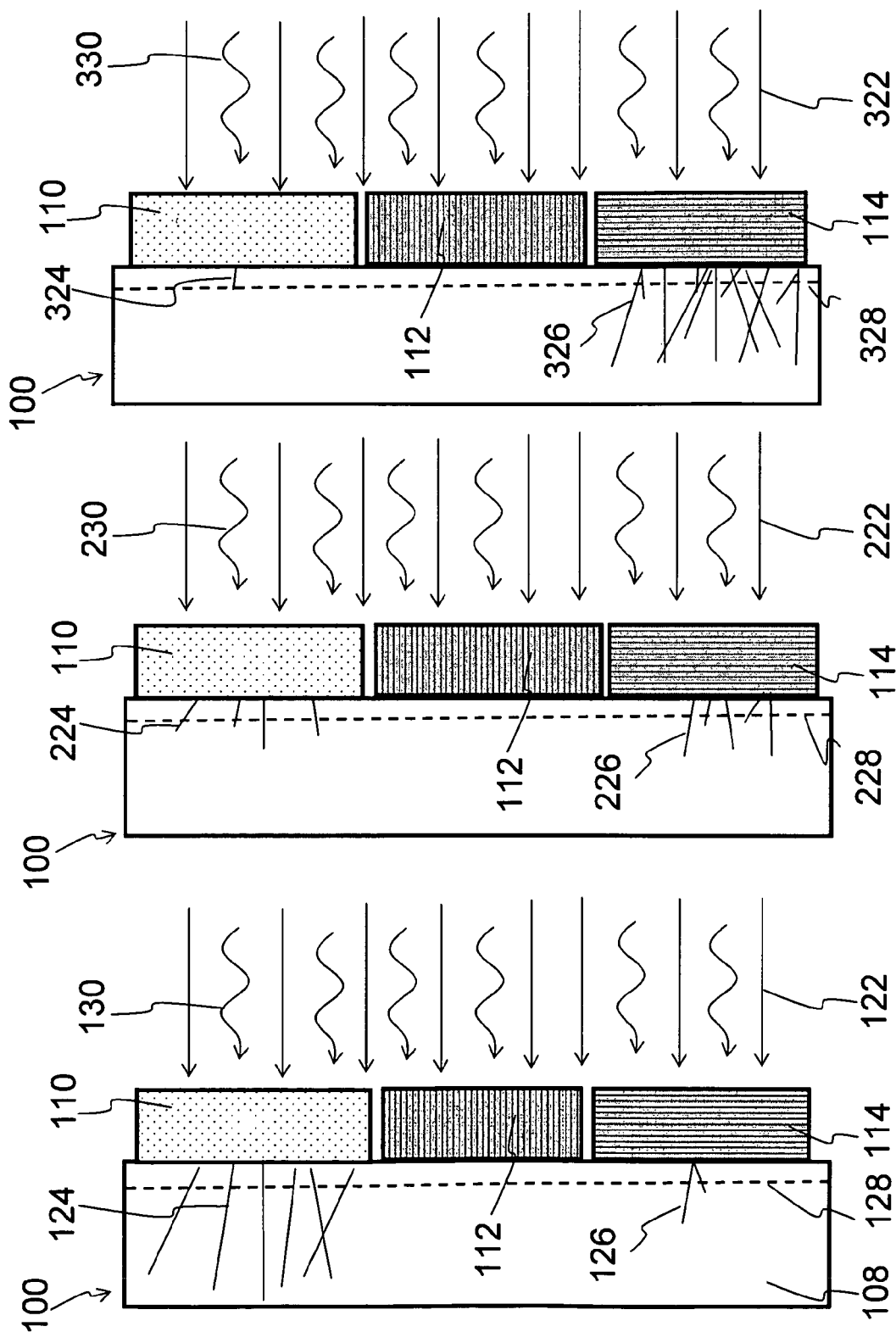

Table 1

| Delivered neutron dose in tissue, mSv | Delivered gamma dose in tissue, mSv | Total dose equivalent in tissue, mSv | Polyethylene signal, ×10⁵, a.u. | Teflon signal ×10⁵, a.u. | Difference ×10⁵, a.u. | Reported neutron dose in tissue, mSv | Reported gamma dose in tissue, mSv | Total reported dose in tissue, mSv |
|---|---|---|---|---|---|---|---|---|
| 100 | 33 | 136.025 | 2356.99 | 1824.61 | 532.38 | 101 | 37.84 | 138.84 |
| 100 | 110 | 213.025 | 6132.38 | 5322.571 | 809.809 | 153 | 110.55 | 263.55 |
| 30 | 11 | 41.9075 | 725.74 | 566.4857 | 159.2543 | 30 | 11.77 | 41.77 |
| 30 | 11 | 41.9075 | 947.72 | 780.2095 | 167.5105 | 32 | 16.17 | 48.17 |
| 30 | 33 | 63.9075 | 1791.08 | 1578.324 | 212.756 | 40 | 32.78 | 72.78 |
| 30 | 33 | 63.9075 | 1856.88 | 1719.924 | 136.956 | 25 | 35.75 | 60.75 |
| 30 | 110 | 140.9075 | 5262.23 | 4910.667 | 351.563 | 66 | 101.97 | 167.97 |

FIG. 19

METHOD OF LUMINESCENT SOLID STATE DOSIMETRY OF MIXED RADIATIONS

BACKGROUND OF THE INVENTION

1. Field of the Invention

This invention relates generally to radiation dosimetry techniques.

2. Background of the Technology

The measurement of neutrons and heavy charged particles (HCP) remains one of the most challenging tasks in radiation dosimetry. Among the most widely investigated and used passive detector technologies are: plastic nuclear track detectors (PNTD) based on CR-39 plastic and its derivatives, pairs of $^6$LiF and $^7$LiF thermoluminescent detectors (TLD) in an albedo configuration and superheated bubble detectors (SBD). See Benton et al., "Proton Recoil Neutron Dosimeter for Personnel Monitoring. Health Phys., 40, pp. 801-809 (1981); Piesch et al., "Albedo Dosimetry System for Routine Personnel Monitoring," Radiat. Prot. Dosim., 23(1/4), pp. 117-120 (1988); d'Errico, "Radiation Dosimetry and Spectrometry with Superheated Emulsions," Nuclear Instr. Meth. B, 184, pp. 229-254 (2001). TLDs have the strong neutron energy dependence and the difficulty in discriminating between radiations having low- and high linear energy transfer (LET). PNTDs have good neutron/gamma discrimination but require laborious wet-chemistry processing and have low saturation fluence. SBDs are very sensitive to neutrons but bulky and environmentally unstable. All these difficulties have stimulated the search for a new approach.

SUMMARY OF THE INVENTION

According to a first broad aspect of the present invention, there is provided a method comprising the following steps: (a) providing one or more respective values of one or more respective dosimetric parameters for a luminescent material irradiated with one or more radiations; and (b) determining an absorbed dose for the one or more radiations based on the respective values of the one or more respective dosimetric parameters, wherein the one or more dosimetric parameters are each based on a spatial frequency domain analysis of one or more high spatial resolution fluorescence images of the luminescent material.

According to a second broad aspect of the present invention, there is provided a method comprising the following steps: (a) providing a depth profile of one or more dosimetric parameters for one or more radiations based on measurements of one or more high spatial resolution fluorescence images at different depths below the surface of a luminescent material covered by one or more converters; and (b) determining a median energy of one or more radiations based on the depth profile analysis.

According to a third broad aspect of the present invention, there is provided a method comprising the following steps: (a) providing a first value of a first dosimetric parameter and a second value of a second dosimetric parameter; and (b) determining the median energy of neutrons in the radiation field based on the ratio between the first value and the second value, wherein the first value of the first dosimetric parameter is obtained for the luminescent material covered by a first converter and wherein the second value of the second dosimetric parameter is obtained for the luminescent material covered by a second converter, and wherein the first and second dosimetric parameters are each based on an analysis of one or more high spatial resolution fluorescence images of the luminescent material.

According to a fourth broad aspect of the present invention, there is provided a method comprising the following steps: (a) providing a luminescent material providing one or more radiation-induced fluorescence signals; and (b) removing the one or more radiation-induced fluorescence signals from the luminescent material by illuminating this luminescent material with laser light at power density sufficient for multiphoton absorption and photo-ionization.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the invention.

FIG. 1 is a schematic diagram of a dosimeter configuration according to one embodiment of the present invention irradiated with neutrons having median energy of about 7 MeV;

FIG. 2 is a schematic diagram of the dosimeter configuration of FIG. 1 irradiated with neutrons having median energy of about 1 MeV;

FIG. 3 is a schematic diagram of the dosimeter configuration of FIG. 1 irradiated with neutrons having median energy of about 60 keV;

FIG. 19 is a table summarizing the results of fast neutrons and gamma dose discrimination according to one embodiment of the present invention.

DETAILED DESCRIPTION

Figure 4:
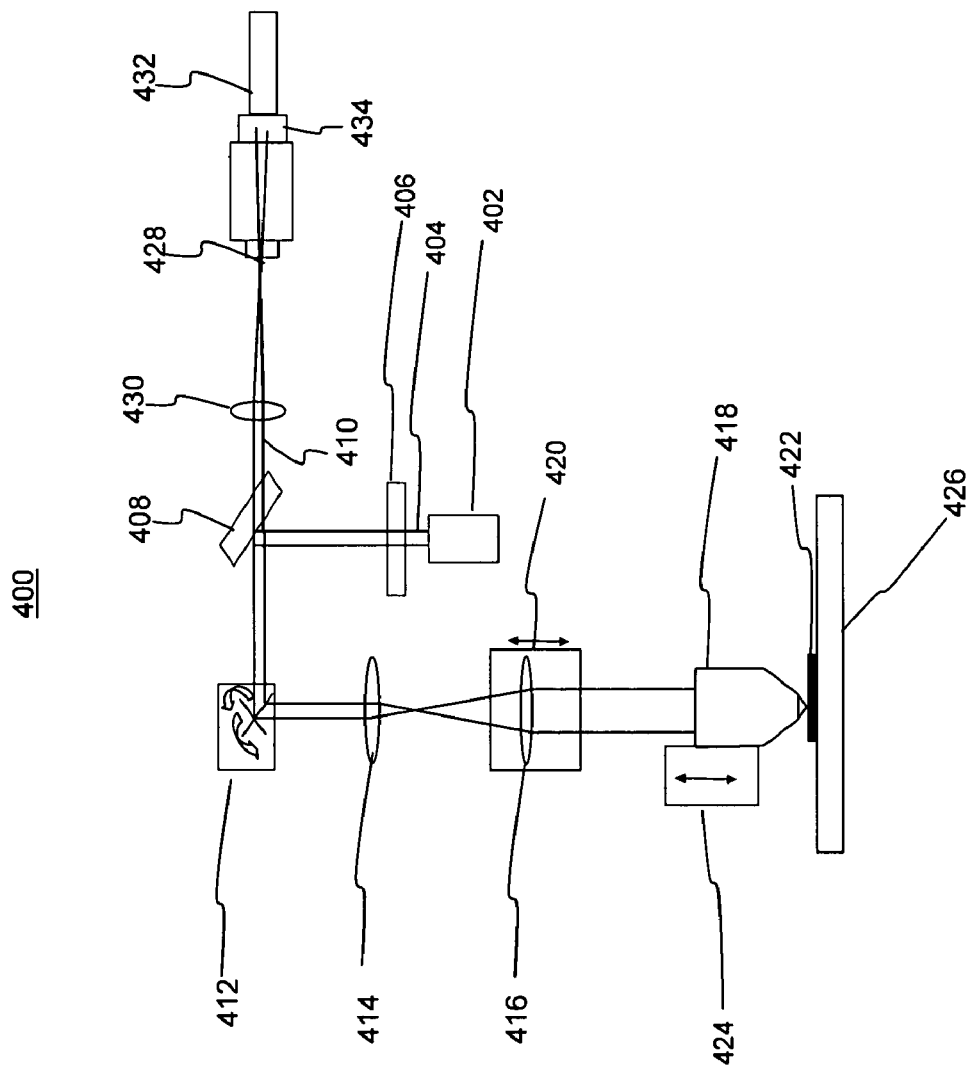
FIG. 4 is a schematic diagram of the confocal laser scanning readout aparatus used in the current invention to obtaining fluorescence images of neutron and gamma irradiated detectors.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "upper", "lower", "above", "below", "left", "right", "horizontal", "vertical", "upward", "downward", etc. are merely used for convenience in describing the various embodiments of the present invention.

For the purposes of the present invention, a value or property is "based" on a particular value, property, the satisfaction of a condition, or other factor, if that value is derived by performing a mathematical calculation or logical decision using that value, property or other factor. For example, a dosimetry detection device used with the method of the present invention may be calibrated based on the spatial distribution of fluorescence measured by the device when the device is used to measure the fluorescence of a luminescent material exposed to heavy charged particle of known type, energy and angle of incidence.

For the purposes of the present invention, the term "cover" refers to a converter material that abuts or is slightly spaced from a luminescent material or a portion of a luminescent material.

For the purposes of the present invention, the term "angle of incidence" refers to the angle between the direction of the particle trajectory and the normal to the detector surface.

For the purposes of the present invention, the term "close proximity" refers to a distance comparable with the penetration range of heavy charge particles in a particular medium.

For the purposes of the present invention, the term "color center" refers to the conventional meaning of the term "color center", i.e. a point defect in a crystal lattice that gives rise to an optical absorption in a crystal and upon light excitation produces a photon of luminescence. A color center, an impurity or an intrinsic defect in a crystalline material creates an unstable species. An electron localized on this unstable species or defect performs a quantum transition to an excited state by absorbing a photon of light and performs a quantum transition back to a ground state by emitting a photon of luminescence.

For the purposes of the present invention, the term "confocal detection" refers generally to the descanned detection of fluorescent light where the light emitted from the focal plane (specimen) and from the planes located above and below the latter reaches a dichroic beam splitter or mirror. This dichroic beam splitter/mirror separates the fluorescent light from the excitation light, with the fluorescent light being subsequently focused on a diaphragm (confocal diaphragm/pinhole) located precisely in a plane conjugate to the focal plane. The optical resolution of the microscope may be adjusted by varying the size of the diaphragm. Another dichroic blocking filter which again suppresses the excitation radiation is located in front or behind the diaphragm. After passing the blocking filter, the fluorescent light is measured by a photodetector. A typical confocal detection scheme involves the arrangement of a scanning confocal microscope in which a small aperture is installed in front of a photodetector in the position of the secondary focus of the imaging system and where the laser beam reflected from the medium or the laser induced fluorescence light from the medium is collected by the objective lens and is imaged on the aperture using a dichroic beam splitter or mirror.

For the purposes of the present invention, the term "converter of radiation" or just "converter" refers to a layer of the material used to convert one type of radiation into another. For example hydrogen-containing material like polyethylene is used to convert non-ionizing neutron radiation into recoil or knockout protons which are capable of performing ionization in luminescent detector material. Another example of a converter of radiation is lithium fluoride (LiF) that naturally contains $^6Li$ that has a high capture cross-section for moderated and thermal neutrons with alpha particles and tritium ions as nuclear reaction products that ionize the detector material and produce fluorescent tracks. Yet another well-known type of thermal neutron converter is any material containing isotope of $^{10}B$—like boron oxide and boron carbide. For maintaining electron equilibrium when detecting X-rays or gamma photons while discriminating against neutrons, converters are made of non-hydrogen-containing material like fluorinated plastics (polytetrafluoroethylene—Teflon®).

For the purposes of the present invention, the term "crystalline material" refers to the conventional meaning of the term "crystalline material", i e., any material that has orderly or periodic arrangement of atoms in its structure.

For the purposes of the present invention, the term "defect" refers to the conventional meaning of the term "defect" with respect to the lattice of a crystal, i.e. a vacancy, interstitial, impurity atom or any other imperfection in a lattice of a crystal.

For the purposes of the present invention, the term "detectable dose" refers to the dose, amount, level, etc. of heavy charged particles, neutrons, gamma radiation, etc., that is detectable, measurable, etc., above the background noise level.

For the purposes of the present invention, the term "directly ionizing radiation" refers to energetic charge particles such as: fast electrons/beta particles, helium ions/alpha particles, hydrogen ions/protons, heavy ions, etc.

For the purposes of the present invention, the term "dosimetric parameter" refers to the value or the number determined from processing the fluorescent image of irradiated luminescent material and is directly related to the dose of radiation absorbed by the detector.

For the purposes of the present invention, the term "fast neutron" refers to the conventional meaning of the term "fast neutrons" meaning neutrons with energies above 10 keV.

For the purposes of the present invention, the term "fluorescence" refers to the conventional meaning of the term "fluorescence", i.e., a type of luminescence in which an atom, molecule, etc., emits visible radiation during quantum transition from a higher to a lower electronic state and where the time interval between absorption and emission of energy is typically extremely short (e.g., $10^{-9}$ to $10^{-3}$ seconds).

For the purposes of the present invention, the term "fluorescent color centers" refers to color centers that are able to fluoresce under light stimulation For the purposes of the present invention, the term "F-type center" refers to any one of the following centers: F-center, $F^+$-center, $F_2^+$-center, $F_2^{2+}$-center, $F_2^+(2Mg)$-center, $F_2^{2+}(2Mg)$-center, etc.

For the purposes of the present invention, the term "heavy charged particle (HCP)" refers to nuclei or ions that originate, for example, from radioactive nuclear decay, from space, from an accelerator, etc. Some representative, but nonlimiting examples of heavy charged particles include: alpha particles, tritium ions, protons, recoil protons, etc.

For the purposes of the present invention the term "neutron capture cross-section" refers to the value of the parameter characterizing the efficiency of the atomic nuclei to absorb neutrons and undergo nuclear reactions that may result in emission of gamma photons, electrons, heavy charge particles. This parameter characterizes the probability of neutron to be captured by atom per unit of neutron path length and has units of area.

For the purposes of the present invention, the term "high energy photons" refers to photons with energy above 30 keV. At higher photon energies fluorescence parameters obtained from $Al_2O_3$ detector do not change significantly with depth of imaging.

For the purposes of the present invention, the term "high spatial resolution imaging" refers to imaging able to resolve small objects comparable in size with the wavelength of the excitation light.

For the purposes of the present invention, the term "highly penetrating radiation" refers to radiation having penetration range comparable with or greater than the thickness of the detector or the absorber. Examples of highly penetrating radiation are gamma and X-ray photons, neutrons, high energy beta particles, etc.

For the purposes of the present invention, the term "imaged field" refers to experimentally acquired single image.

For the purposes of the present invention, the term "indirectly ionizing radiation" refers to X-rays, gamma photons, or neutrons.

For the purposes of the present invention, the term "ionizing radiation" refers to any particulate or electromagnetic radiation that is capable of dissociating atoms into ions and electrons. The present invention may be used to determine doses of both directly ionizing radiation and indirectly ionizing radiation.

For the purposes of the present invention, the term "irradiation" refers to the conventional meaning of the term "irradiation", i.e., exposure to high energy charge particles, e.g. electrons, protons, alpha particles, etc., or electromagnetic radiation of wave-lengths shorter than those of visible light, e.g., gamma rays, x-ray, ultraviolet, etc.

For the purposes of the present invention, the term "linear energy transfer" (LET) refers to the average energy imparted to a medium by radiation of a specified energy upon penetrating a short specified distance.

For the purposes of the present invention, the term "low penetrating radiation" refers to radiation from heavy charged particles having penetration range significantly smaller than the thickness of the detector or the absorber. Examples of low penetrating radiation are: alpha particles, recoil protons, etc.

For the purposes of the present invention, the term "luminescence" refers to the conventional meaning of the term "luminescence", i.e., the visible or invisible electromagnetic radiation produced by solids, liquids and gases (emitters) and that is not accompanied by high temperature of the emitter, but is the result of the absorption of excitation energy in the form of photons, charged particles, chemical interactions, etc.

For the purposes of the present invention, the term "luminescent material" refers to any material, composition, compound, etc., that exhibits luminescence.

For the purposes of the present invention, the term "maximum penetration range" or "penetration range" refers to the distance in the medium at which a heavy charged particle stops to rest.

For the purposes of the present invention, the term "moderated neutrons" refers to neutrons produced by slowing fast neutrons by a hydrogen or deuterium containing moderator and having a large contribution of low energy neutrons in the energy range from 0.025 eV to 10 keV.

For the purposes of the present invention, the term "nuclear fragments" refers to one or more fragments of a nucleus produced a variety of processes, both natural and human made. For example, nuclear fragments may be made by accelerators, nuclear reactors, emitted from radioisotopes, produced by nuclear reactions, originated from solar activity or from galactic cosmic rays.

For the purposes of the present invention, the term "optically stimulated luminescence (OSL)" refers to luminescence generated by optical stimulation (illumination) of irradiated material. Wavelength of luminescence is usually different from the wavelength of stimulation light.

For the purposes of the present invention, the term "oxygen vacancy defect" refers to a defect caused by an oxygen vacancy in a lattice of a crystalline material. An oxygen vacancy defect may be a single oxygen vacancy defect, a double oxygen defect, a triple oxygen vacancy defect, or more than triple oxygen vacancy defect. An oxygen vacancy defect may be associated with one or more impurity atoms or may be associated with an interstitial intrinsic defect such as misplaced interstitial oxygen atoms. Occupancy of an oxygen vacancy by two electrons gives rise to a neutral F-center, whereas occupancy of any oxygen vacancy by one electron forms an $F^+$-center. An $F^+$-center has a positive charge, with respect to the lattice. A cluster of oxygen vacancy defects formed by double oxygen vacancies is referred to as an $F_2$-type center. A cluster of oxygen vacancy defects formed by two $F^+$-centers and charge-compensated by two Mg-impurity atoms is referred to as a $F_2^{2+}(2Mg)$-center.

For the purposes of the present invention, the term "passive detection" refers to the detection technique that does not require any active electronic circuitry and a supply of electrical power.

For the purposes of the present invention, the term "penetrating photon radiation" refers to short wavelength electromagnetic radiation originated from radioactive nuclear decay, from space or produced by accelerating or decelerating of charge particles, for example, in X-ray machine or in an accelerator.

For the purposes of the present invention, the term "penetrating beta radiation" refers to high energy electrons originated from radioactive nuclear decay, from space, produced by radiation-induced ionization of atoms or by acceleration in an electric field.

For the purposes of the present invention, the term "portion" refers to any portion of an object or material, including the entire object and material. For example, a converter that covers a "portion" of a luminescent material may cover part or all of one or more surfaces of the luminescent material.

For the purposes of the present invention, the term "radiation dosimetry" refers to the conventional meaning of the term "radiation dosimetry", i.e., the measurement of the amount of radiation dose delivered to the material, the object or the body of an individual.

For the purposes of the present invention, the term "radiochromic material" refers to a material that changes coloration, optical absorption or fluorescence properties when exposed to radiation. Color centers and fluorescent color centers may exist before the exposure to radiation or may be activated when the material is exposed to radiation.

For the purposes of the present invention, the term "recoil protons" refers to those protons that are generated by the collision of neutrons with a converter containing a source of hydrogen atoms, e.g. polyethylene.

For the purposes of the present invention, the term "thermoluminescence (TL)" refers to the conventional meaning of the term "TL", i.e., luminescence that occurs from irradiated solids under thermal stimulation (e.g. during heating).

For the purposes of the present invention, the term "track" refers to latent or visible image of a particle trajectory penetrating the medium.

For the purposes of the present invention, the term "transform" refers to conventional mathematical meaning of the term "transform." In mathematics, a transform is an operator that may be applied to a function to simplify one or more operations. Examples of such transforms include: Fourier, Hankel (Fourier-Bessel), Hartly, Hilbert, Laplace, Wavelet, Z-transforms, etc.

For the purposes of the present invention, the term "trap" refers to an electron trap or a hole trap. A trap is a structural defect in a crystal lattice able to create a localized electronic state and capable of capturing a free electron or a hole from the conduction or valence band of the crystalline material.

Description

The measurement of neutrons presents a special problem. Neutron radiation is not a directly ionizing type of radiation and requires transformation or conversion into ionizing radiation (e.g., electrons or heavy charged particles) that can be detected by detectors based on ionization of the detector medium. Detection of thermal neutrons requires nuclear reaction and conversion with isotopes such as $^6$Li or $^{10}$B having large thermal neutron capture cross-section. Fast neutron detection is most efficient using plastic converters containing high concentration of hydrogen. Having the same mass as a neutron, a proton can accept most of the kinetic energy of a neutron in head-on collision. The high energy recoil protons generated by these collisions are then able to cause ionization in the detector medium. The amplified signal from the active or passive detector is then processed and provides dosimetric or spectroscopic information about the radiation field.

Dosimeters and methods for detecting neutrons and heavy charged particles based on optically stimulated luminescence, thermoluminescence, and other luminescent and fluorescent techniques have been described in the art. For example, an optically stimulated luminescent, fast neutron sensor and dosimeter is described in U.S. Pat. No. 6,140,651 to Justus et al., issued Oct. 31, 2000. The described fast neutron sensor and dosimeter comprises a proton radiator with a doped glass, such as Nd-doped glass containing ZnS:Cu and may be read by either laser heating or infrared stimulation of the glass or by direct scintillation. Other types of inorganic doped glasses, including silver doped glasses may be used in the dosimeter of the present invention.

Thermoluminescent dosimeters and methods for reading thermoluminescent radiation are also described in U.S. Pat. No. 4,638,163 to Braunlich et al., issued Jan. 20, 1987; U.S. Pat. No. 4,825,084 to Braunlich et al., issued Apr. 25, 1989; U.S. Pat. No. 4,839,518 to Braunlich et al., issued Jun. 13, 1989; and U.S. Pat. No. 5,015,855 to Braunlich et al., issued May 14, 1991. The described dosimeters and methods measure ionizing radiation, particularly heavy charged particles emitted from radioactive materials and other heavy charged particle radiation sources by laser heating and thermoluminescence of phosphors, using, for example, a thin layer of thermoluminescent phosphor material and an inorganic binder heat bonded to a substrate, as described in U.S. Pat. No. 4,825,084 (Braunlich et al).

A fluorescent glass dosimeter for reading a radiation dose is also described in U.S. Pat. No. 5,057,693 to Burgkhardt et al., issued Oct. 15, 1991. The described dosimeter reads a radiation dose from a fluorescent glass element, where the radiation dose is determined from the intensity of the fluorescence emitted from the glass element's detecting face. A fluorescence diaphragm arrangement is provided so as to overlay the glass element detecting face and is movable thereon for changing the fluorescence detecting areas and a fluorescence intensity reading device is provided for determining fluorescence intensity distribution and the glass element detecting face.

A neutron dosimetry method, dosimeter and system are also described in U.S. Pat. No. 5,319,210 to Moscovitch, issued Jun. 7, 1994 and U.S. Pat. No. 5,498,876 (Moscovitch), issued Mar. 12, 1996. The method, dosimeter and system described stores information in a three dimensional fluorescent optical memory element that is altered by exposing the optical memory element to neutron radiation and dosimetric information is subsequently retrieved and analyzed by readout of the altered data with the laser system. One described optical memory element is a three dimensional optical random access memory (ORAM) comprising a volume of a transparent polymer doped with a light sensitive chemical such as spirobenzopyran, which is also described in Moscovitch et al., "Radiation Dosimetry Using Three-Dimensional Optical Random Access Memories," Nucl. Inst. Meth. Phys. Res. Vol. 184 (2001), pp. 207-18.

Unfortunately, the lower efficiency of detection and poorer discrimination between absorbed doses induced by heavy charged particles versus gamma radiation, remain as obstacles to the dosimetry of neutrons by prior dosimeters and methods. Prior dosimeters and methods may have limited spatial resolution, are sometimes not provided with imaging and/or spectroscopic capabilities or systems, may be able only to detect strongly penetrating photon and beta radiation, and may not be able to detect and image individual track of heavy charged particles. In particular, in integrating thermoluminescent and optically stimulated luminescent detectors, the small amounts of intense fluorescence produced within the particle track may be masked by the luminescence occurring from the significantly larger crystal volume as a result of photon and electron interactions. Thermoluminescent detectors and methods are also not able to detect every heavy charged particle incident and may have very low detection efficiencies. In addition, thermoluminescent methods are very slow, requiring tens of milliseconds per data point. Dosimeters and methods based on organic memory materials such a three-dimensional ORAM require pre-recorded optical data stored in the memory medium, require several spatially distributed bits to be affected by radiation and may not posses the sensitivity and spatial resolution required for imaging individual tracks of heavy charged particles.

A method of neutron dosimetry employing confocal laser scanning fluorescence imaging and track counting has been described in U.S. Pat. No. 7,141,804 "Detection of neutrons and heavy charged particles" to Akselrod et al. and the entire disclosure and contents of this patent is hereby incorporated by reference. The method provides a new luminescent material and a new optical system to detect individual tracks produced by recoil protons and other heavy charged particles, but it is limited to relatively pure neutron fields without significant gamma photons contribution.

In various embodiments, the present invention provides dosimetric detectors, luminescent materials and methods that provide one or more of the following features: (1) detection of gamma radiation; (2) detection of neutron radiation; (3) discrimination between gamma and neutron radiations; (3) high spatial resolution fluorescence imaging of the radiation field, for example mixed gamma-neutron fields; (4) processing of high spatial resolution fluorescence images to obtain the dosimetric parameter proportional to the absorbed dose; (5) assessment of median energy of neutron radiation by measuring depth profile of fluorescence signal from luminescent material covered by hydrogen-containing converter material; (6) assessment of median energy of neutron radiation by providing the ratio of fluorescence signals obtained from the detector behind two converters of radiation; and (7) erasing/ removing the radiation-induced fluorescence signal and resetting detectors to background signal level.

In one embodiment, the present invention provides a new approach to determine the dose of radiation through evaluation of modulation of fluorescence intensity within at least one image acquired from an irradiated luminescent material. The modulation of fluorescence intensity is caused by non-uniform distribution of ionization produced either by recoil protons generated by neutrons or by delta electrons generated by gamma photons. Quantitative evaluation of fluorescence intensity modulation is determined for example by calculating the spatial frequency power spectrum integral that appeared to be directly proportional to the absorbed dose.

The method of the present invention does not require detection and counting of individual fluorescence tracks but does employ high spatial resolution imaging of an irradiated luminescent material. In one embodiment, the method of the present invention provides a way to measure and calculate doses of both gamma and neutron radiation using a novel analog parameter derived from a spatial frequency domain analysis of high resolution fluorescence images of an irradiated luminescent material. High resolution imaging in this context refers to an optical resolution of the imaging system that is determined by the diffraction limit of light microscopy that is approximately equal to $0.6\lambda/NA$, where $\lambda$ is the wavelength of the fluorescence emission light, and NA is the numerical aperture of the objective lens. Actual diameter of recoil proton track or a delta electron track is in nanometer range, whereas actual features that are imaged by the optical system are in the range of a fraction of the micron. Correspondently the range of useful spatial frequencies according to one particular implementation of the method of present invention is determined by the emission wavelength of $Al_2O_3$: C,Mg equal to 750 nm and the 0.95 NA of the objective lens. One particular example of the spatial frequency range used in demonstration of this invention is justified theoretically and empirically and determines the most favorable parameters for both image acquisition and image processing. High spatial frequencies (above $1.5\ \mu m^{-1}$) do not contain much information related to radiation and constitute mechanical, optical and electronic noise of the imaging system. Low spatial frequencies (below $0.01\ \mu m^{-1}$) are also not associated with effect of radiation exposure and are mostly related to nonuniformity of luminescent material properties. Different range of spatial frequencies that correspond to higher or lower optical resolution may be used for other luminescent materials and imaging systems. For example near field optical microscope may achieve significantly higher resolution and may be used in implementation of the present invention. The value of the power spectrum integral calculated within this range of spatial frequencies provides one of several new parameters discovered to be proportional to the absorbed dose for both neutron and gamma radiation. Another discovered and tested analog parameter that is proportional to absorbed dose is the amplitude of the lowest frequencies of the power spectrum.

Different luminescent materials sensitive to radiation may be used in various embodiments of the method of the present invention. First of all these materials should be radiochromic, meaning that they undergo transformation of their optical, including luminescent, properties as a result of irradiation. Second, these luminescent materials intended for dosimetric measurements should demonstrate relatively stable optical properties before and after irradiation, meaning, for example, that radiation induced luminescence should not fade (or decay) with time at room or elevated temperatures. Luminescent materials that may be used in the method of the present invention include, but are not limited to, dielectric inorganic crystals like oxides, sulfides, halides, nitrides and carbides of metals, inorganic and organic glasses, organic polymers and dyes. Radiochromic transformations caused by radiation may be both electronic and structural. In the first case, only electronic transitions take place with minimal change in distance between atoms and the material structure, where as, in the second case, major structural transformation and breakage of chemical bonds might take place.

In one embodiment of the present invention, the storage of dosimetric information is based on ionization of the crystal matrix, generation of free electrons and holes followed by the capture of electrons and holes by traps and color centers.

In one embodiment, the present invention utilizes a luminescent material that comprises aluminum oxide crystals doped with carbon and magnesium ($Al_2O_3$:C,Mg) and containing plurality of oxygen vacancy defects such as described in U.S. Pat. No. 6,846,434 to Akselrod, and in U.S. Pat. No. 7,098,470 to Akselrod et al., the entire contents and disclosures of which are hereby incorporated by reference. $Al_2O_3$: C,Mg crystals possesses important properties for the purposes if the present invention. $Al_2O_3$:C,Mg crystals are luminescent, undergo radiochromic transformation that have an electronic nature, and $Al_2O_3$:C,Mg crystals are temporally and temperature stable in a transformed state. Fluorescent aluminum oxide materials are not sensitive to visible light before or after irradiation and may be read non-destructively multiple times. Another important advantage of aluminum oxide crystals is that the technology of crystal growth, cutting and polishing of this material is well established.

Single crystals of $Al_2O_3$:C,Mg are characterized by several optical absorption (OA) bands with a blue absorption band responsible for the visible green coloration of the crystal.

These crystals have a high concentration of single and double oxygen vacancies in the form of neutral F-centers as well as $F^+$ and $F_2^{2+}$ centers, charge-compensated by the nearby Mg-impurity atoms. The aggregate defect composed of two oxygen vacancies and two Mg-impurity atoms with two localized electrons are denoted herein as $F_2^{2+}$(2Mg) and is responsible for a blue absorption-excitation band at 435 nm that produces a green fluorescence centered at 520 nm, and has a short fluorescent lifetime of 9±3 ns. Another color center, believed to be a tri-electron $F_2^+$(2Mg)-center, is obtained as a result of radiation induced conversion when an electron is captured by another $F_2^{2+}$(2Mg)-center. The $F_2^+$(2Mg)-center has at least two absorption/excitation bands 335 and 620 nm and has fluorescence emission at 750 nm with a 75±5 ns lifetime.

Unirradiated $Al_2O_3$ crystals contain a high concentration of Type I color centers responsible for the blue absorption band at 435 nm and emission at 520 nm (presumably $F_2^{2+}$(2Mg)-centers) and a low concentration of Type II color centers responsible for 335 and 620 nm absorption band and 750 nm emission band (presumably $F_2^+$(2Mg)-centers). After exposure to ionizing radiation, the concentration of Type I color centers is reduced and the concentration of Type II color centers is increased. The absorbed dose is determined by the intensity of fluorescence of either Type I centers (520 nm) or Type II color centers (750 nm). The typical way to perform measurements is to illuminate the $Al_2O_3$:C,Mg crystal with red laser light (for example laser diodes with wavelength at 635 or 650 nm) and to measure the intensity of 750 nm fluorescence.

In addition to metal oxides, in some embodiments of the present invention, the luminescent material of the present invention may be organic materials having color centers and able to produce fluorescence under optical stimulation. For example, Parthenopoulos et al. describe organic luminescent materials that may be used in some embodiments of the present invention in D. A. Parthenopoulos and P. M. Rentzepis, *Three-Dimensional Optical Storage Memory*, Science, Vol. 245, pp. 843-845, August 1989, the entire contents and disclosure of which is hereby incorporated by reference. U.S. Pat. No. 5,319,210 to Moscovitch, issued Jun. 7, 1994 and U.S. Pat. No. 5,498,876 to Moscovitch, issued Mar. 12, 1996 also describes organic luminescent materials that may be used in some embodiments of the present invention, and the entire contents and disclosures of these patents are hereby incorporated by reference.

The luminescent materials comprising $Al_2O_3$:C,Mg crystals that may be utilized in various embodiments of the present invention contain high concentration of traps and color centers able to capture free electrons and holes generated during irradiation and is able to produce fluorescence under optical excitation. According to one embodiment of the method of present invention the modulation of generated fluorescence intensity is generally proportional to the absorbed dose of radiation. To obtain dosimetric information, the detection of this fluorescence may be performed with a confocal detection scheme that allows for high spatial resolution of fluorescence. Principles of confocal fluorescent microscopy are well known (see, for example, *Confocal and two-photon microscopy: Foundations, applications, and advances*, Edited by A. Diaspro, Wiley-Liss New-York, pp 19-38, 2002, the entire contents and disclosure of which is hereby incorporated by reference. A confocal detection scheme allows one to detect fluorescence only from a spatially localized focal spot of the excitation of laser light.

One of the most difficult tasks in radiation dosimetry is discrimination of different radiations, especially neutrons. Because neutrons are indirectly-ionizing radiation, passive integrating radiation detectors, such as these doped $Al_2O_3$ crystals that rely on ionization effects, are not very sensitive to neutrons. Accordingly, the neutrons need to be converted to directly ionizing radiation, such as alpha particles, energetic protons, etc., to be detected by such crystals. In case of thermal neutrons, conversion of neutrons into alpha particles is achieved by nuclear reaction with radioactive elements, such as $^6Li$ and $^{10}B$, having a large thermal nuclear capture cross-section. For dosimetry of fast neutrons, recoil protons from hydrogen rich plastics, like polyethylene, are generated. These converters of neutrons may be associated with, attached to or otherwise in contact with the luminescent material, may be mixed or merged with the luminescent material or may be even be part of or incorporated into the luminescent material. Alpha and beta particles and protons originated from radionuclides and accelerator facilities, as well as heavy charged particles of cosmic rays usually do not need any conversion but detector sensitivity strongly depends on their respective atomic number and energy.

In one embodiment, the present invention also provides dosimetry method for neutron radiation. Detection of neutron radiation may be achieved according to the present invention by positioning this luminescent material in close proximity to at least one converter of neutron irradiation, with the converter transforming or converting the indirectly-ionizing neutron radiation into ionizing radiation, e.g., heavy charged particles, such as alpha particles, tritium ions, recoil protons, etc., that then irradiate the luminescent material.

In one embodiment, the present invention provides a method of discriminating between doses of high energy photons (gamma and x-ray) and neutron radiation by positioning several converters in front of the luminescent detector. One of these converters is made of a hydrogen-containing material, for example high density polyethylene and the area of detector in contact with it and provides the information to determine the dose of both fast neutrons and gamma photons. Another converter made of material containing isotopes with large thermal neutron capture cross-section (e.g. $^6LiF$) and provides for the dose of moderated neutrons and gamma photons. The third converter is made of non-hydrogen-containing material and the detector behind it provides for the dose of gamma radiation. The doses of fast and moderated neutrons is determined after subtraction of the gamma induced signal from the first two signals obtained behind hydrogen-containing and $^6Li$ containing converters.

The present invention also provides a method for determining the median energy of fast neutron field by scanning a detector with the laser beam using a fluorescence confocal detection technique and by measuring the depth distribution of the fluorescent signal in the detector being placed in contact with a hydrogen-containing converter material. Recoil protons generated by relatively low energy neutrons have the lowest range of penetration into luminescent material and the depth profile shows fast decay with depth. High energy neutrons generate longer range recoils and the fluorescence signal reduces slower with the depth of fluorescence imaging. The energy determination technique utilizes the same imaging technique but may use either of two methods of image processing—counted track density or spatial frequency power spectrum integral. The first one is preferred at low doses of fast neutrons, whereas the second one is preferred for moderate and high doses. After calibration measurements the depth at which one of these parameters is reduced to a selected value/level that is a fraction of the value/level of the parameter at the surface of the material is used to determine the median neutron energy. For example, the selected value/level may be 1/e or ½ of the surface value/level.

In yet another embodiment of the present invention the method is provided to determine the median energy of neutrons by calculating the ratio between two dosimetric parameters obtained behind two different converters made of, for example, hydrogen-containing and $^6$Li-containing materials.

FIGS. 1, 2 and 3 show dosimeter 100 according to one embodiment of the present invention being irradiated with neutrons in mixed neutron-gamma fields. In FIGS. 1, 2, and 3, dosimeter 100 includes a radiation sensitive detector 108 made of a luminescent material covered by three different converters: a hydrogen-containing plastic converter 110, a non-hydrogen-containing plastic converter 112 and lithium-containing converter 114. FIG. 1 qualitatively depicts the result of irradiation with neutrons 122 having median energy of about 7 MeV, producing charge particle tracks 124 and 126 at a depth of imaging 128. In FIG. 1, dosimeter 100 is also exposed to a dose of photons 130 mixed with neutrons 122. In FIG. 1, the average penetration range and number of charge particle tracks 124 greatly exceed the average penetration and number of charge particle tracks 126. FIG. 2 qualitatively depicts the result of irradiation with neutrons 222 having median energy of about 1 MeV, producing charge particle tracks 224 and 226 at a depth of imaging 228. In FIG. 2, dosimeter 100 is also exposed to a dose of photons 230 mixed with neutrons 222. In FIG. 2, the number of charge particle tracks 226 slightly exceed the range and number of charge particle tracks 224. FIG. 3 qualitatively depicts the result of irradiation with neutrons 322 having median energy of about 60 keV, a low energy, producing charge particle tracks 324 and 326 at a depth of imaging 328. In FIG. 3, dosimeter 100 is also exposed to a dose of photons 330 mixed with neutrons 322. In FIG. 3, the average penetration depth and number of charge particle tracks 326 greatly exceed the average penetration depth and number of charge particle tracks 324.

Depending on the energy of incident neutrons, the number of charged particle tracks at the depth of imaging in the dosimeter vary, and this fact allows one to estimate the median energy of incident neutrons according to one embodiment of the present invention. Dosimetric fluorescence parameters measured behind the non-hydrogen-containing plastic converter allows for determining the dose of photons and the subtraction of this dose of photons from the data obtained behind the other two converters i.e. the hydrogen-containing plastic converter and the lithium-containing converter.

In one embodiment of the present invention, the radiation sensitive detector may be a fluorescent nuclear track detector (FNTD).

In one embodiment of the present invention, the hydrogen-containing plastic converter is made of high density polyethylene (HDPE).

In one embodiment the non-hydrogen containing plastic converter may be made from polytetrafluoroethylene (PTFE) manufactured by DuPont under the trade name Teflon®.

In one embodiment the lithium-containing converter is made from a LiF chip containing a $^6$Li isotope.

FIG. 4 shows an apparatus 400 for carrying out a method according to one embodiment of the present invention. A fiber-optically coupled and collimated laser diode 402 producing laser light 404 and is controlled by the electronic shutter 406. A long-wavelength-pass dichroic mirror 408, is used to reflect the excitation laser light 404 and transmit fluorescence indicated by beam 410. Two-axis galvanometer mirrors 412 are used for two-dimensional (XY) scanning, whereas relay lenses 414 and 416 provide imaging conditions between the galvanometer mirrors and the back aperture of the objective lens 418. Spherical aberration compensation (SAC) for scanning the fluorescent detector at different depth below the surface is achieved by moving the lens 416 along the optical axis of the system with the translation stage 420. Axial (Z) position of the objective lens focal point determining the depth of scanning in the detector crystal 422 is provided by a piezo-actuator stage 424. To image multiple areas the detector is moved with the two-dimensional linear translation stages 426. The fluorescence excited by the laser light 402 is collected by the same objective lens 418, imaged back by relay lenses 416 and 414 on the galvanometer mirrors and is descanned by them. The fluorescence is further transmitted through the dichroic mirror 408, imaged on a confocal pinhole 428 by confocal lens 430 and detected by a silicon avalanche photodiode (APD) 432 installed behind the pinhole. An additional optical filter 434 in front of the APD rejects residual laser light.

The confocal pinhole is a spatial filter, blocking all fluorescence originating outside of the focal spot of the objective lens and providing diffraction limited spatial discrimination. Images are formed as an array of voltages obtained by the data acquisition board from the photodetector. The confocal detection scheme allows for high spatial and depth resolution under the condition of one-photon absorption, even when areas of the crystal adjacent to the focal spot of the stimulation light also produce fluorescence.

In one embodiment of the present invention, the laser diode produces 15 mW laser light having a wavelength of at 639 nm.

The position of the crystal surface is determined by finding the peak reflection of the laser beam from the polished detector surface. Images with a field of view of up to 200 by 200 µm$^2$ are produced by 1000 scans with an increment of 200 nm. The stimulation laser beam is focused at different depths below the crystal surface and sequential layer-by-layer imaging is then made. Data from each layer is then processed using the method of the present invention. Control of all system components, and data and image processing is performed by National Instruments hardware and LabView™ program.

Figure 5:
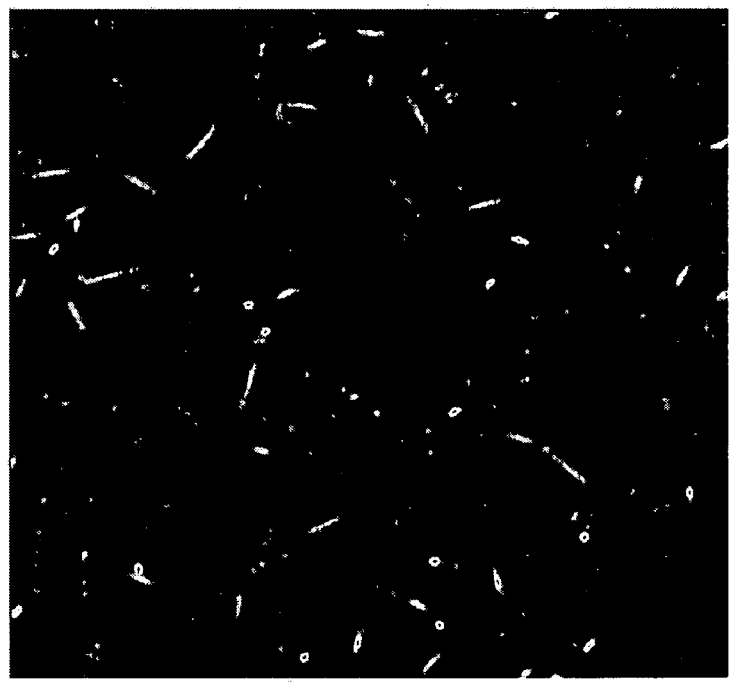
FIG. 5 is a confocal fluorescent image of $Al_2O_3$:C,Mg single crystal detector after irradiation with 60 mSv of AmBe fast neutrons.

FIG. 5 shows a fluorescence image from an Al$_2$O$_3$:C,Mg detector obtained after high dose neutrons (300 mSv). The tracks of recoil protons at this level of dose overlap which makes it difficult to process the image using object recognition and the track counting method. In one embodiment, the method of the present invention provides the parameter of fluorescence intensity modulation (for example spatial frequency power spectrum integral) and allows processing of radiation induced images for high neutron doses and for mixed gamma-neutron fields.

Figure 6:
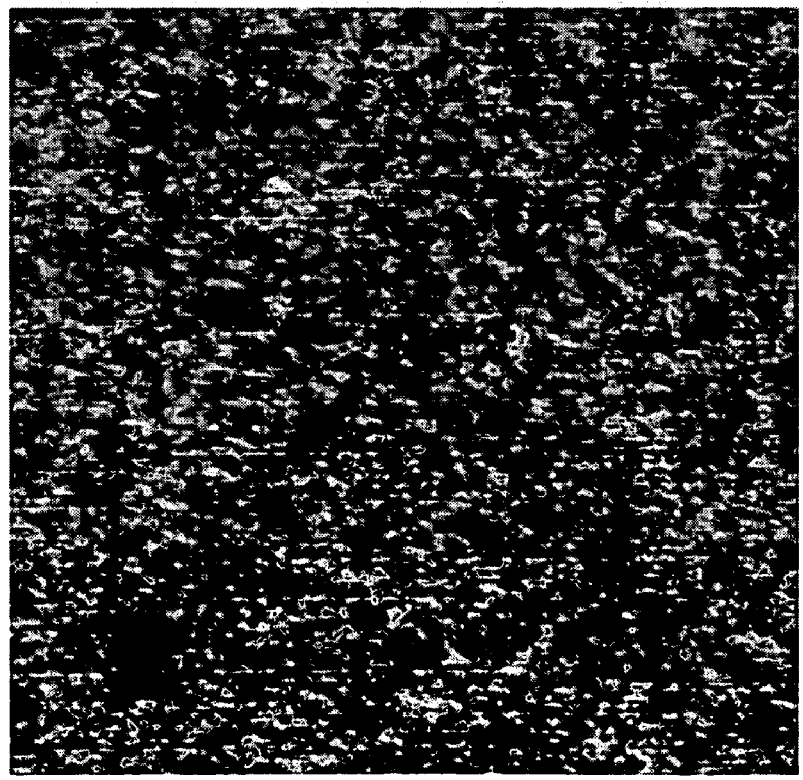
FIG. 6 is a confocal fluorescent image of $Al_2O_3$:C,Mg single crystal detector after irradiation with 30 mGy of $^{137}$Cs gamma radiation.

FIG. 6 is an example of fluorescence image obtained from the detector irradiated with 30 mGy of $^{137}$Cs gamma photons. The detector is covered by non-hydrogen-containing converter material (PTFE) during irradiation. The modulation of fluorescence intensity is caused by overlapping delta electrons and in the case of mixed neutron-gamma radiations, the modulation of fluorescence intensity caused by photons makes it difficult to perform track counting of neutron-induced recoil protons. In one embodiment, the method of the present invention provides a parameter of fluorescence intensity modulation that is proportional to the sum of absorbed dose of neutrons and gamma radiation. Having the dosimeter with two hydrogen and non-hydrogen-containing converters makes it possible to discriminate and measure neutron and gamma doses.

Figure 7:
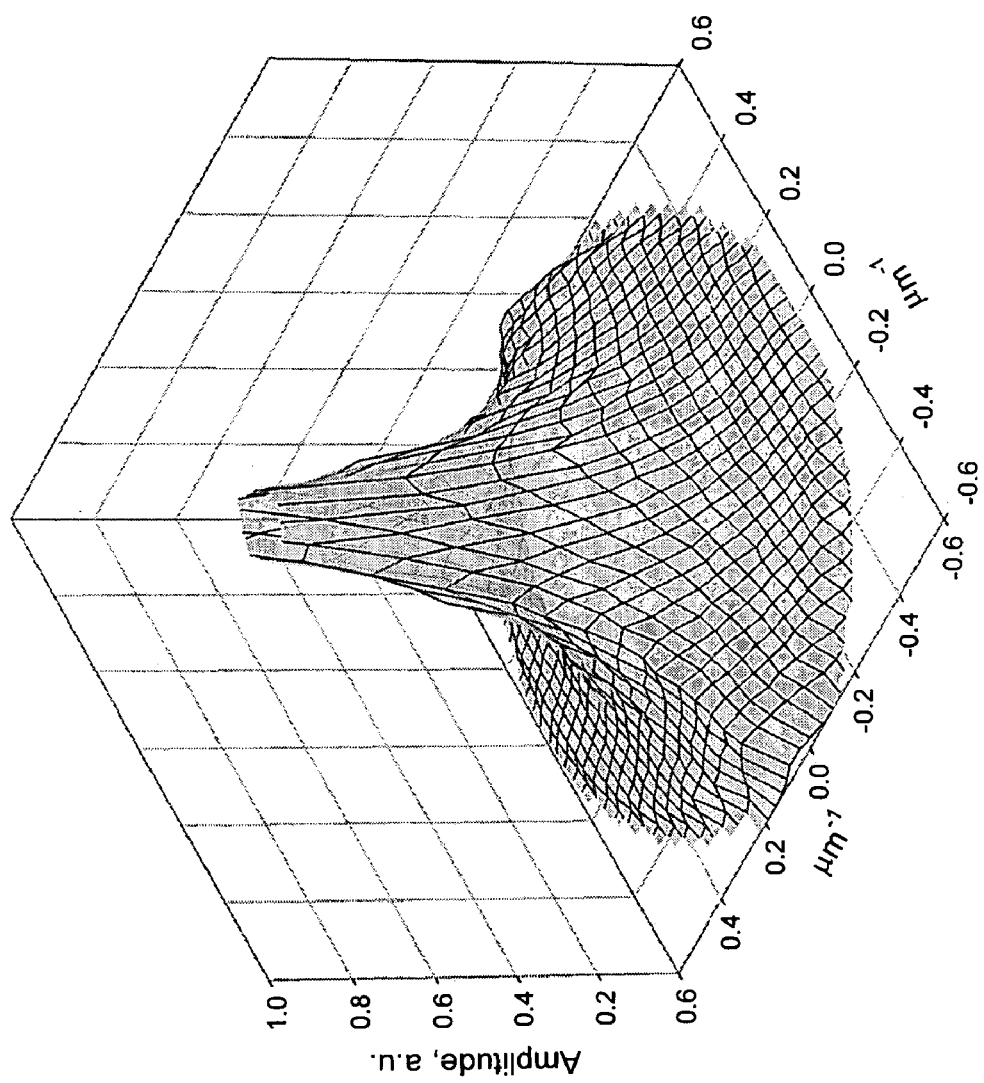
FIG. 7 is a three-dimensional power spectrum obtained by Fast Fourier Transform of a high resolution fluorescent image obtained from a $Al_2O_3$:C,Mg single crystal detector covered by hydrogen-containing converter and iradiated with 0.3 Sv of fast neutrons from an AmBe source.

FIG. 7 shows an an example of a three-dimensional representation of spatial frequency power spectrum obtained by Fast Fourier Transform of two-dimensional high resolution fluorescence images of an Al$_2$O$_3$:C,Mg single crystal detector covered by a hydrogen-containing converter and iradiated with 0.3 Sv of fast neutrons from an AmBe source. The highest spectral power density induced by radiation is always at lower spatial frequencies, that according to the conventional optical representation are plotted at the center of the graph.

Figure 8:
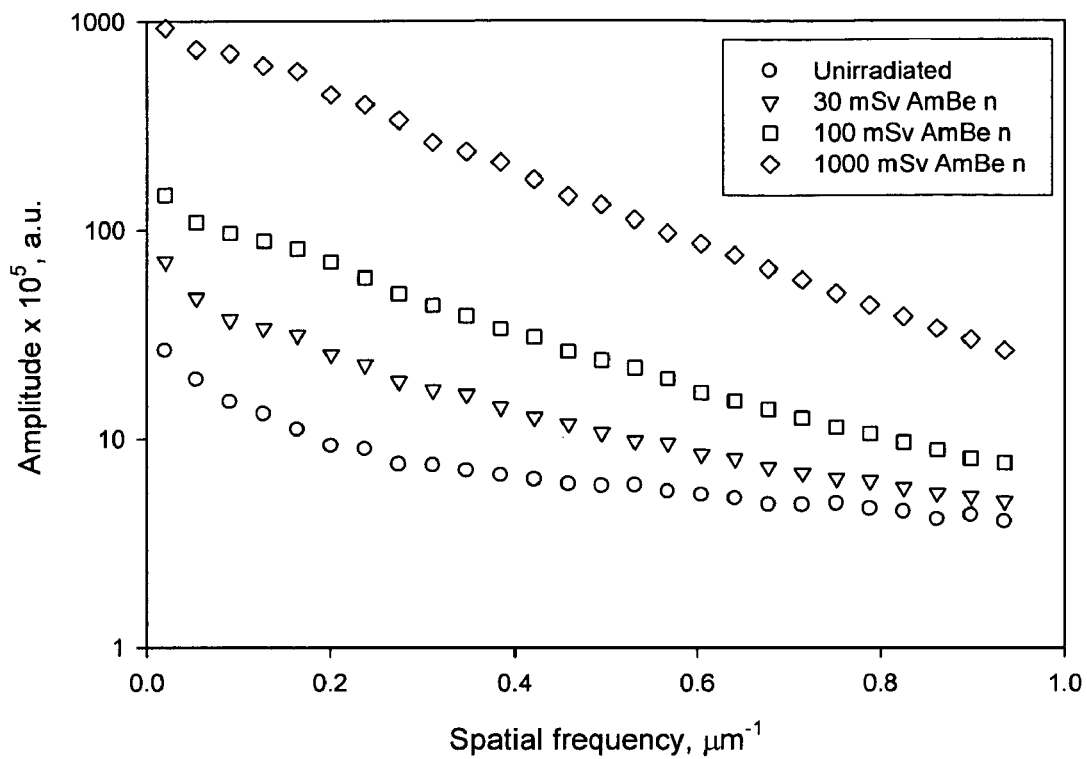
FIG. 8 provides power spectra of spatial frequencies obtained from fluorescence images of $Al_2O_3$:C,Mg detectors unirradiated and irradiated with 30, 100 and 1000 mSv of AmBe fast neutrons obtained by integrating two-dimensional power spectra in cylindrical coordinates.
Figure 9:
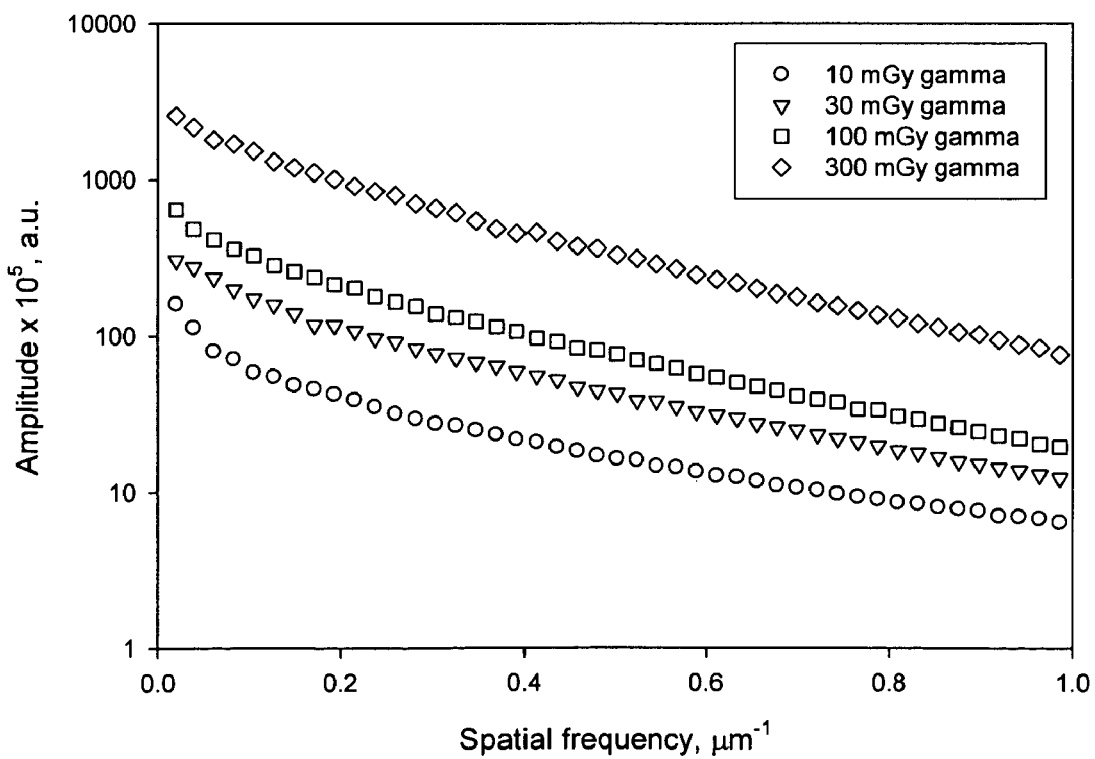
FIG. 9 provides power spectra of spatial frequencies obtained from fluorescence images of $Al_2O_3$:C,Mg detectors irradiated with 10, 30, 100, and 300 mGy of $^{137}$Cs gamma radiation.

One of the most important features of the method of the present invention is that the intensity of the radiation induced power spectra and its integral change with the dose of both neutrons and gamma radiation. FIG. 8 shows a power spectra of unirradiated FNTD detector and the ones irradiated with 30, 100 and 1000 mSv of AmBe fast neutrons obtained by integrating in cylindrical coordinates of the two-dimensional power spectra similar to the one depicted in FIG. 7. FIG. 9 shows similar results for detectors irradiated with 10, 30, 100, and 300 mGy of $^{137}$Cs gamma radiation. Integration of two-dimensional power spectra is done in cylindrical coordinates.

Figure 10:
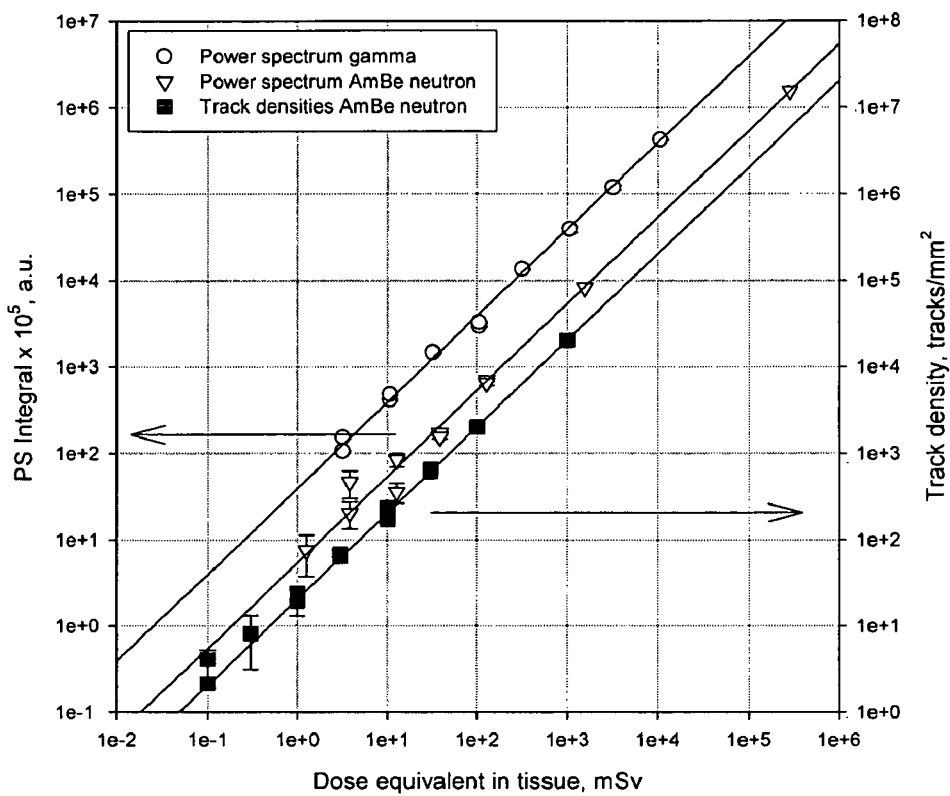
FIG. 10 is a graph showing dose dependences for two methods of dose determination: track counting mode (filled square symbols) and power spectrum mode (triangles and circles)

The dosimetric parameter "spatial frequency power spectrum integral" is directly proportional to the absorbed dose of radiation. FIG. 10 shows the linear dose dependence for two methods of dose determination: track counting mode (filled square symbols) and power spectrum mode (triangles and circles). Irradiations are done with fast neutrons (triangles) and gamma (circles). The linearity of dose dependence in the wide dynamic range of doses for both neutrons and gamma radiation makes the proposed method attractive for practical application.

Figure 11:
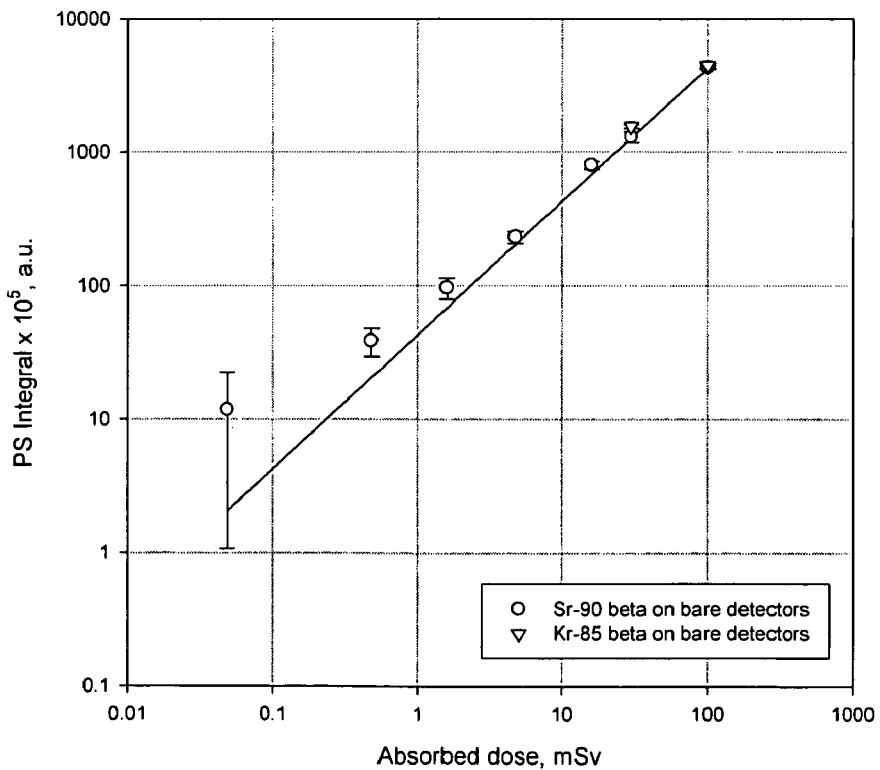
FIG. 11 is a graph showing dose dependence of power spectrum integral for bare $Al_2O_3$:C,Mg detector irradiated with beta particles emitted from $^{90}$Sr/$^{90}$Y and $^{85}$Kr sources.

FIG. 11 shows the dose dependence of the power spectrum integral for bare FNTD detectors irradiated with beta particles emitted from $^{90}$Sr/$^{90}$Y and $^{85}$Kr sources and illustrates its applicability to dosimetry of beta radiation. Non-linearity of dose dependence at low doses is caused by accumulated background dose.

Figure 12:
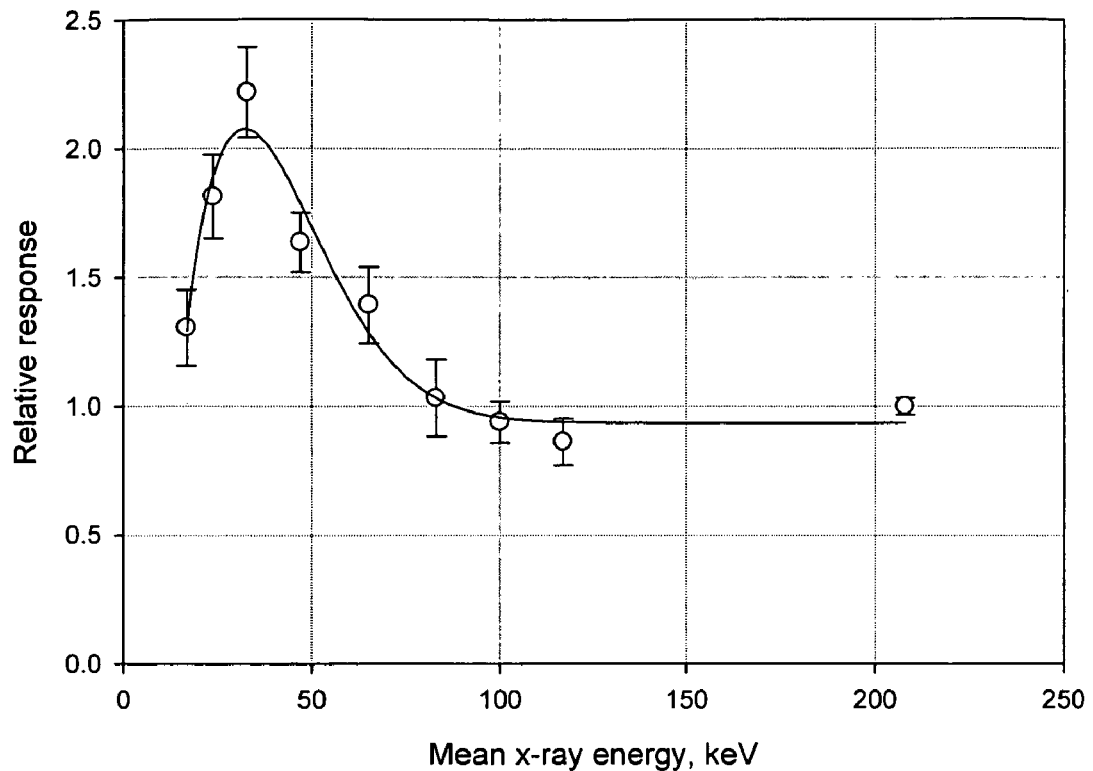
FIG. 12 is a graph showing the normalized photon energy response of the power spectrum integral for $Al_2O_3$:C,Mg detectors irradiated behind polyethylene. The response is normalized to the delivered doses at 208 keV X-rays and corrected for absorption in 1 mm polyethylene converter.

FIG. 12 illustrates normalized photon energy response of the power spectrum integral for aluminum oxide crystals irradiated behind 1 mm polyethylene converters. The irradiations are performed with NS type of X-rays. The response is normalized to the dose delivered with the 208 keV photons and corrected for absorption in a 1 mm polyethylene converter.

Figure 13:
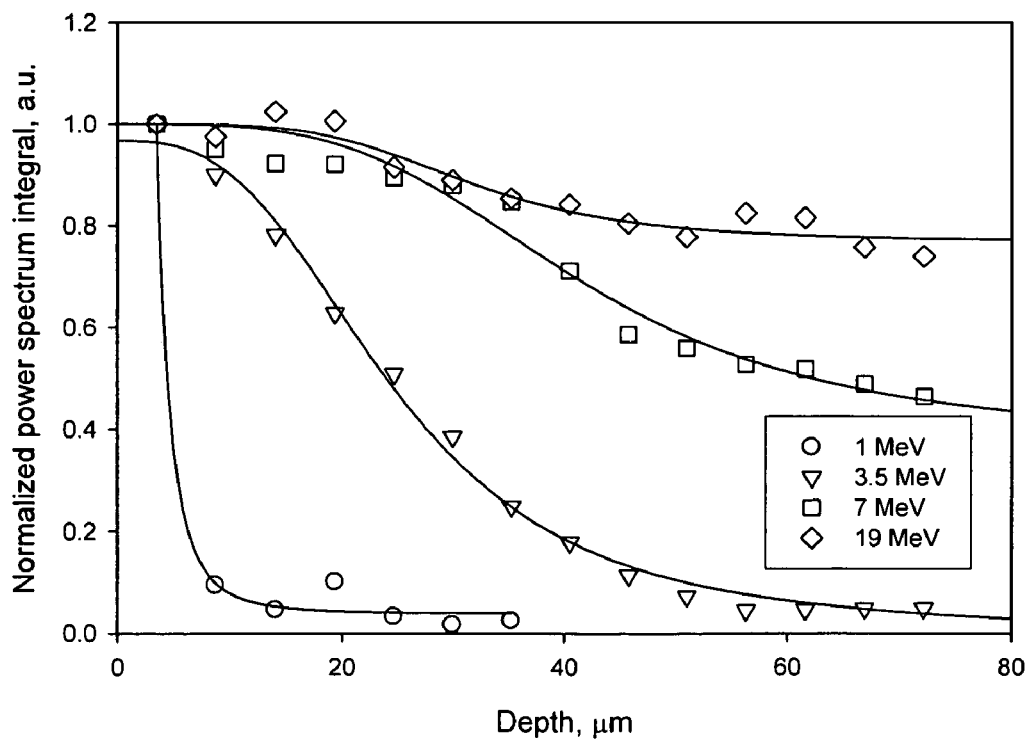
FIG. 13 is a graph showing constant power spectrum integral as a function of depth for $Al_2O_3$:C,Mg detectors irradiated with $^{137}$Cs gamma rays.
Figure 14:
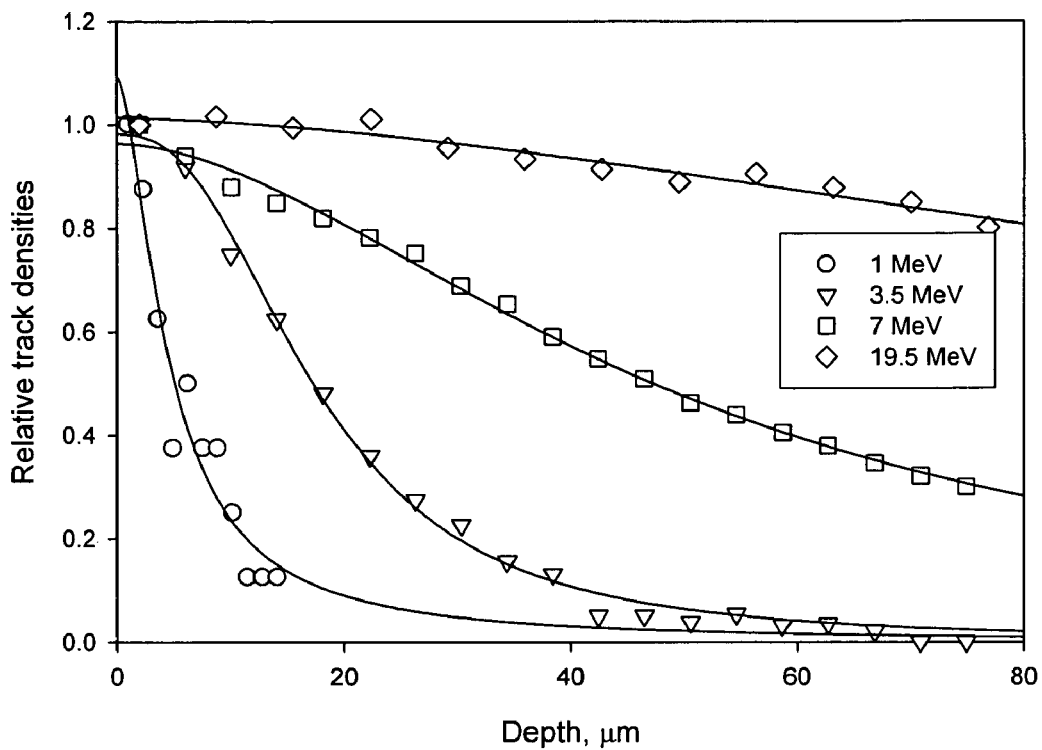
FIG. 14 is a graph showing normalized depth profiles of power spectrum integrals for $Al_2O_3$:C,Mg detectors irradiated with quasi-monoenergetic neutrons and illustrates the spectroscopic capabilities of proposed method. The power spectrum integrals are obtained by confocal fluorescent imaging and Fast Fourier Transform (FFT) processing of the detector at different depths beneath the surface of the detector covered by polyethylene converters during irradiation.
Figure 15:
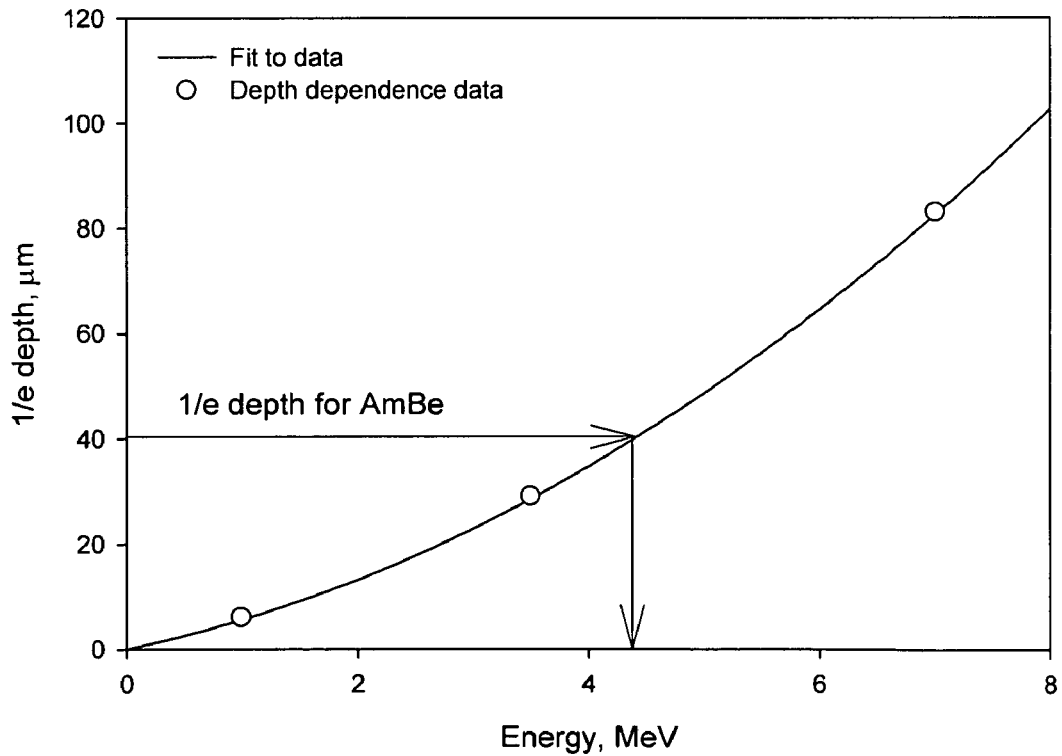
FIG. 15 is a graph showing normalized depth profiles of recoil proton track densities in $Al_2O_3$:C,Mg detectors irradiated with quasi-monoenergetic neutrons and illustrates the spectroscopic capabilities of proposed method. The track density is obtained by imaging the detector at different depths beneath the surface of the detector covered by polyethylene converters during irradiation.

FIGS. 13, 14 and 15 illustrate a method, according to one embodiment of the present invention, for determining the median energy of neutrons by measuring the depth distribution of the fluorescent signal in the detector having been placed in contact with hydrogen-containing converter material. In FIG. 14, the power spectrum integrals are obtained by confocal fluorescent imaging and FFT processing of the detector at different depths beneath the surface of the detector covered by polyethylene converters during irradiation. In FIG. 15, the track density is obtained by fluorescence imaging of the detector and track counting at different depths beneath the surface of the detector covered by polyethylene converters during irradiation.

Recoil protons generated by relatively low energy neutrons have the lowest range of penetration into luminescent material and the depth profile shows fast decay with depth. High energy neutrons generate longer range recoils and the fluorescence signal reduces slower with the depth of fluorescence imaging. The energy determination technique utilizes the same imaging technique but may use either of two methods of image processing: (1) counting track density (FIG. 13) or (2) performing FFT and calculating the spatial frequency power spectrum integral (FIG. 14). The first method of imaging processing may be preferred at low doses of fast neutrons, whereas the second method of image processing may be preferred for moderate and high doses. After calibration measurements the depth at which one of these parameters is reduced to a selected value/level that is a fraction of the value/level of the parameter at the surface of the material is used to determine the median neutron energy (FIG. 15). For example, the selected value/level may be 1/e or ½ of the surface value/level.

Figure 16:
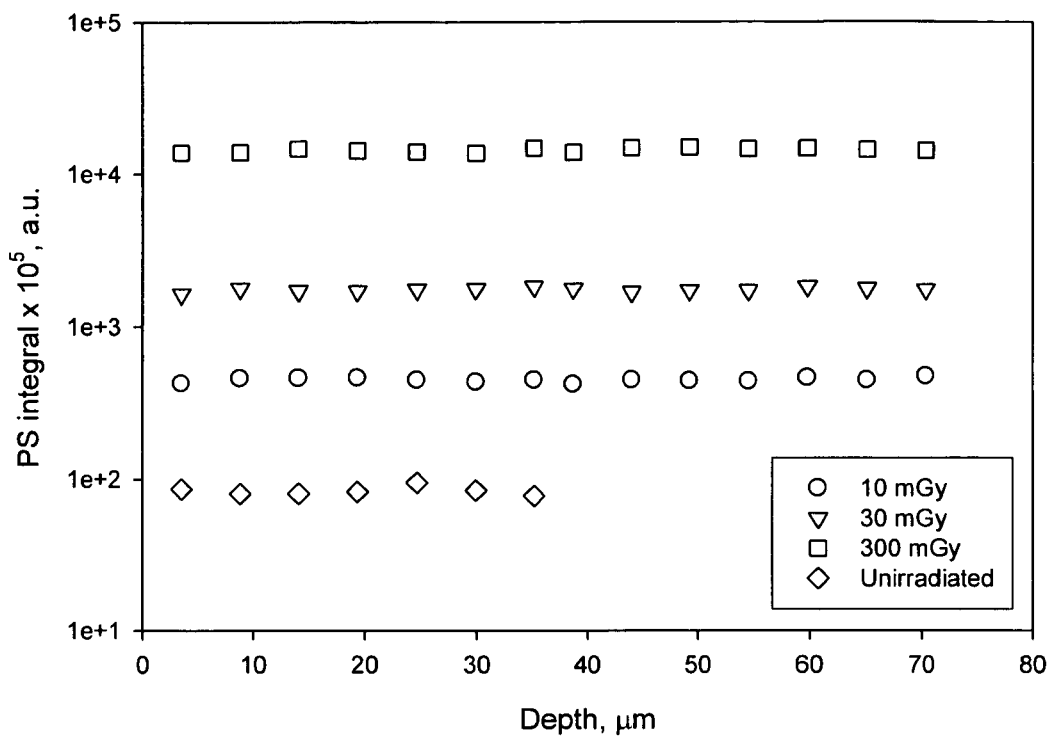
FIG. 16 is a graph showing a method of determining the median energy of a neutron field by using a calibration curve and the crystal depth at which the track density or power spectrum integral is reduced to 1/e of that at the detector surface.

In comparison with recoil protons generated in a HDPE converter by neutrons, gamma radiation has a relatively small linear absorption coefficient and provides a constant value of the power spectrum integral as a function of depth when there is electron equilibrium near the detector surface. Transient charged particle equilibrium is provided by covering the detector with a layer of converter—e.g. PTFE or HDPE. FIG. 16 shows four sets of data for depth profiles obtained for an unirradiated detector and for detectors irradiated with 10, 30, and 300 mGy of $^{137}$Cs gamma photons. The value of the measured parameter increases with the dose but it stays constant with depth and indicates uniform distribution of ionization density. The results presented in FIG. 16 are characteristic for high energy photons. The apparatus depicted in FIG. 4 and used in the above described experiments is able to compensate for spherical aberrations and obtain fluorescence images at relatively low depth—up to 80 microns, but skilled in the art would be able to further extend the range of these measurements where low energy photons provide measurable decay as a function of dose.

Figure 17:
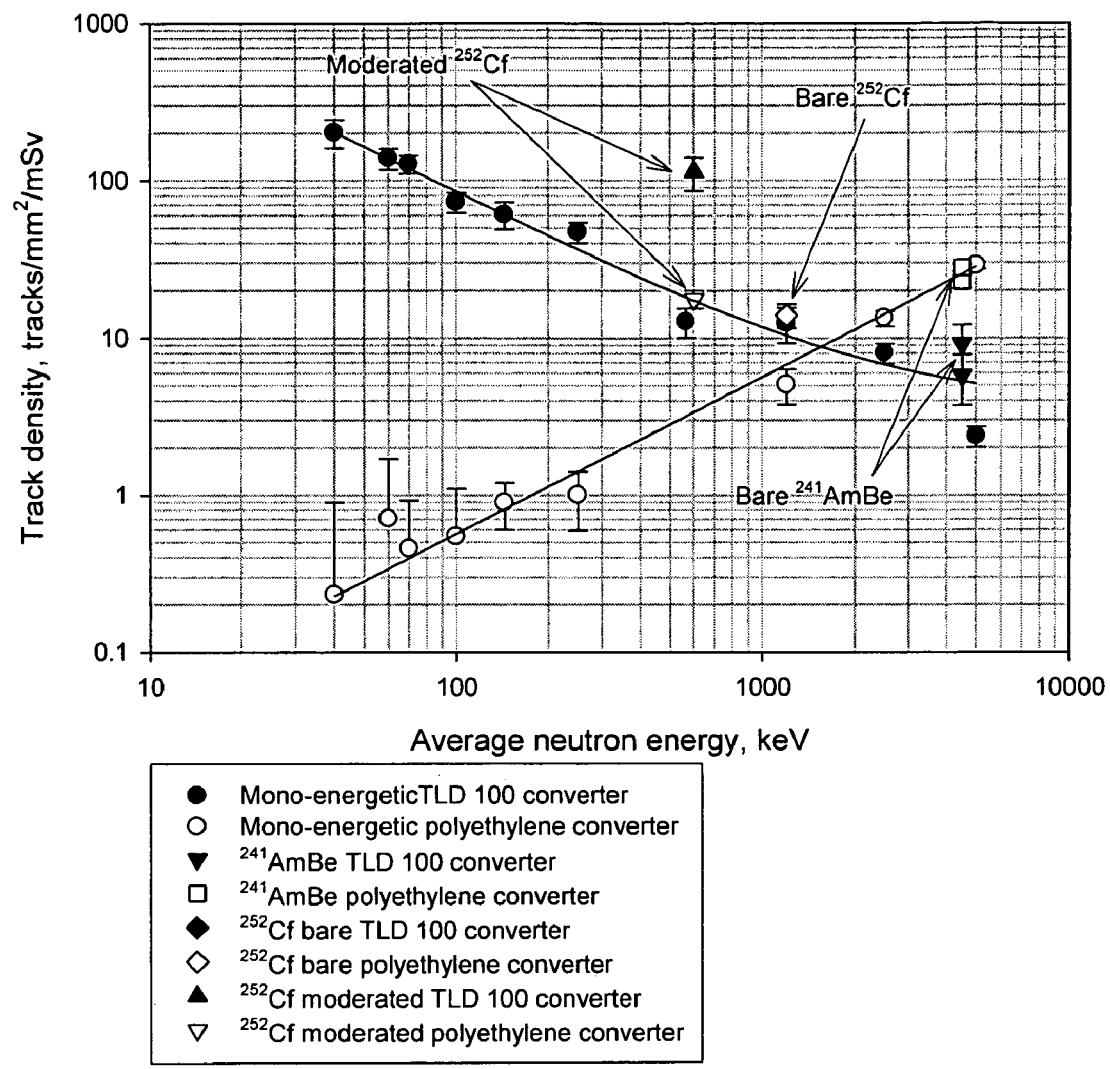
FIG. 17 is a graph showing the energy dependence for $Al_2O_3$:C,Mg detectors covered by hydrogen-containing converters—high density polyethylene (HDPE) (open symbols) and $^6Li$ containing converters (LiF with natural abundance of $^6Li$) (filled symbols). The irradiations are performed with monoenergetic and broad spectrum neutrons and measurements are done in track counting mode.

Another way of measuring median neutron energies according to the method of the present invention is illustrated by the results shown in FIG. 17 in which the measurements are done in track counting mode. In this set of experiments, aluminum oxide fluorescent nuclear track detectors are irradiated with monoenergetic and broad spectrum neutrons, while the detectors are in close proximity to two types of converters: HDPE and LiF chips with natural abundance of $^6$Li isotope. Monoenergetic neutrons in the energy range from 40 keV to 4.5 MeV are produced in nuclear reactions of high energy protons generated by a Van-de-Graff accelerator on tritium and deuterium targets. Imaging of detectors is performed at a single depth of 3 μm for both types of converters and the measured track density is plotted as function of the reported neutron energy. The detectors behind the HDPE converters show increase in track density with the increase of neutron energy, whereas the detectors behind LiF converters show that track density decreases (see FIG. 17). Similar results are expected for the power spectrum mode. Broad spectrum neutrons generated by bare and moderated $^{252}$Cf source as well as by bare AmBe source provide results that do not always fit well with the results obtained for monoenergetic neutrons.

Figure 18:
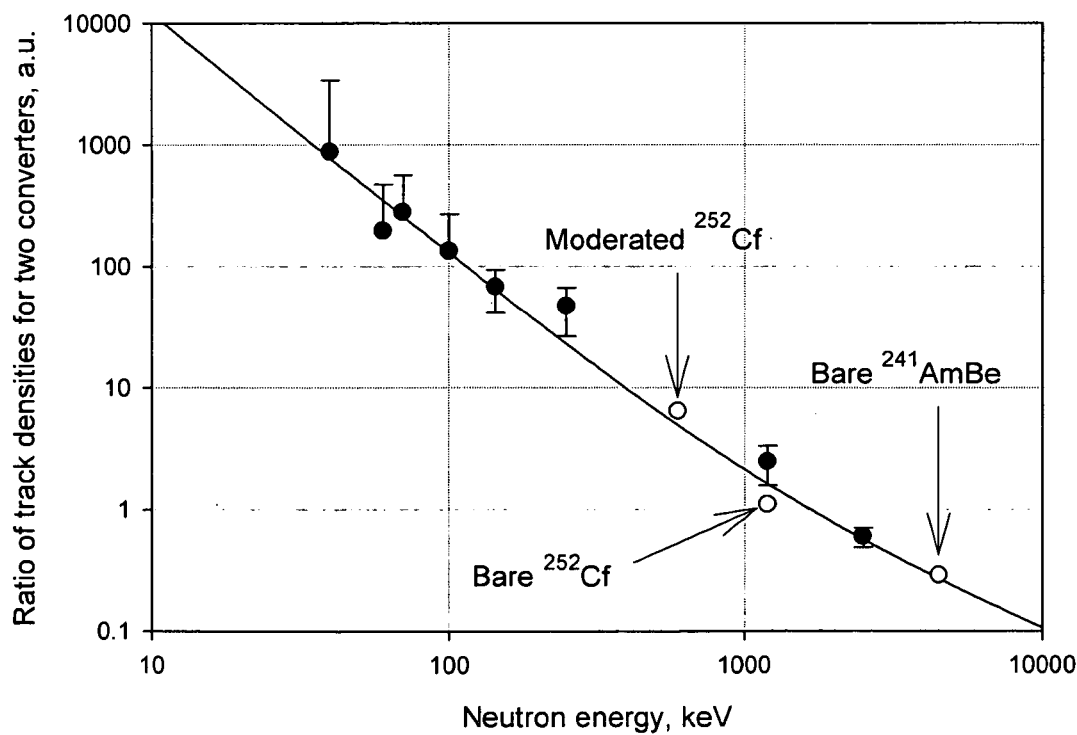
FIG. 18 is a graph showing the energy dependence of the ratio of track densities obtained behind two converters (HDPE and LiF) that covered two areas of the same detector.

According to one embodiment of the present invention another method for the median neutron energy determination is proposed. FIG. 18 shows the energy dependence of the calculated ratio of two fluorescence track densities obtained behind two different converters: HDPE and LiF, which cover two different detectors or two areas of the same detector. The graph further illustrates the capabilities of the proposed method to determine the median energy of an incident neutron field. All of the data points for both monoenergetic and broad spectrum neutrons lay very close to the fitting curve and the test results for the most difficult spectrum of moderated $^{252}$Cf source provide the correct median neutron energy of 600 keV.

The method of the present invention has several important advantages in comparison with other methods of neutron and mixed gamma-neutron dosimetry. It is all-optical, and does not require any wet chemical processing. It allows for easy and fast automatic image processing in parallel with image acquisition. Both methods—track counting and image processing with FFT and the spatial frequency power spectrum integral may be done at the same time. The detectors used in this method are not sensitive to ambient room light before, during or after irradiation, and allow for nondestructive imaging multiple times. The short fluorescent lifetimes involved allow for fast laser scanning and high productivity imaging. Due to the small size of the tracks, the saturation fluorescence and saturation of absorbed dose is many times higher than that for etch-type plastic nuclear track detectors. The new power spectrum integral parameter extends this dynamic range of dose measurements to significantly higher doses up to 100 Gy that, in combination with track counting mode, provides 6 decades of dose dependence linearity. And finally, the present invention provides a relatively simple and quick method of determination of median neutron energies using passive integrating detectors which otherwise require complex active neutron spectrometers.

The present invention will now be further illustrated through the specific examples described below that are meant to be representative of the materials and procedures described above, but should not be considered as limiting thereof.

EXAMPLES

Example 1

Calibration of detector sensitivity to gamma radiation. Detectors made of a luminescent $Al_2O_3$:C,Mg crystal in the form of plates with dimensions 4 mm×6 mm×0.5 mm are cut along the optical c-axis and polished on the larger opposing sides to obtain optically transparent surfaces. The crystalline detectors have a green coloration due to the optical absorption band at 435 nm with an absorption coefficient of 13 cm$^{-1}$. The dosimeter configuration is similar to the configuration of FIGS. 1, 2 and 3 provides the luminescent crystalline detector and two converters: a HDPE converter for gamma plus fast neutron measurements, and a PTFE converter for gamma dose measurements.

A set of $Al_2O_3$:C,Mg luminescent detectors are irradiated with gamma photons from a $^{137}$Cs source with known absorbed dose in tissue in the range from 3 mGy to 10 Gy. The detectors are then read using the laser scanning confocal system schematically shown in FIG. 4 starting with the side in contact with the HDPE converter and then the side in contact with the PTFE converter. The resulting images are processed by performing the Fast Fourier Transform. The magnitude of the FFT is calculated and squared yielding the three-dimensional power spectrum of the image similar to FIG. 7. The power spectrum is then integrated in cylindrical coordinates sequentially from the lowest useful spatial frequency (0.01 µm$^{-1}$) to the largest useful spatial frequency (1.5 µm$^{-1}$) resulting in the amplitude of the power (one-dimensional power spectrum) at frequencies in the image in a range of 0.01 µm$^{-1}$ to 1.5 µm$^{-1}$ similar to FIG. 9. This one-dimensional power spectrum is integrated to provide the parameter known as the power spectrum integral. The power spectrum integral is averaged for all the images from the detector area covered by both PTFE and PTFE converter to reduce uncertainty in the measurements.

This process is repeated for every detector and every dose. The average power spectrum integral is then plotted against the delivered dose of gamma as shown in FIG. 10, with the open circles. The plot is fitted with a linear regression to obtain the slope of the dependence. The slope is the sensitivity of the detectors to gamma radiation from $^{137}$Cs.

Example 2

Calibration of the detector sensitivity to fast neutron radiation. Another set of $Al_2O_3$:C,Mg detectors having both PTFE and HDPE converters are irradiated with neutrons from a $^{241}$AmBe source having an activity of 185 MBq with a range of known doses, for example from 1 mSv to 1,000 mSv in tissue. The plates are then read using the laser scanning confocal system in FIG. 4 starting with the side in contact with the HDPE converter and then the side in contact with the PTFE converter. The resulting images are processed by performing the Fast Fourier Transform. The magnitude of the FFT is calculated and squared yielding the three-dimensional power spectrum of the image similar to FIG. 7. The power spectrum is then integrated in cylindrical coordinates sequentially from the lowest useful spatial frequency (0.01 µm$^{-1}$) to the largest useful spatial frequency (1.5 µm$^{-1}$) resulting in the amplitude of the power (one-dimensional power spectrum) at frequencies in the image in a range of 0.01 µm$^{-1}$ to 1.5 µm$^{-1}$ similar to FIG. 9. This one-dimensional power spectrum is then integrated to provide the power spectrum integral or the amplitude of the function at the low frequencies. The power spectrum integral is averaged for all the images from the detector area covered by an HDPE converter to reduce uncertainty in the measurements.

The area of the detector covered during irradiation by PTFE is than processed in the same manner to obtain the gamma component of a total dose. The average power spectrum integral obtained behind PTFE is then subtracted from the average power spectrum integral obtained behind HDPE to eliminate the gamma contribution. The resulting difference is then plotted against the delivered fast neutron dose and the results are presented in FIG. 10 with the open triangles. The plot is fitted with a linear regression to obtain the slope of the dependence. The slope is the sensitivity of the detectors to fast neutrons from $^{241}$AmBe to be used in all dose calculations.

Example 3

Discriminating neutrons and gamma using PE and polytetrafluoroethylene converters. The dosimeter configuration similar to the configuration of FIGS. 1, 2 and 3 provides the luminescent crystalline detectors and two converters: a HDPE converter for gamma plus fast neutron measurements, and a PTFE converter for gamma dose measurements.

Irradiations of the single crystal detectors are performed with fast neutrons at a distance of 200 mm from a bare $^{241}$AmBe source having an activity of 185 MBq. Gamma irradiation of the same detector is performed from a $^{137}$Cs source in addition to neutron irradiation to imitate a mixed neutron-gamma field. Different ratios of neutron and gamma doses are delivered to the dosimeters and are listed in Table 1 of FIG. 19. Table 1 is a summary of processing mixed neutron-gamma irradiations. The total dose equivalent in tissue contains gamma component from the $^{241}$AmBe irradiations. The plates are processed with the same method as Examples 1 and 2 to obtain the power spectrum integrals behind PTFE and HDPE converters. Neutron-gamma discrimination is achieved using the following approach: gamma dose $D_\gamma$ is calculated using the value of the power spectrum integral behind PTFE, Q(γ) and the sensitivity factor A(γ) obtained during calibration.

$$D_\gamma = \frac{Q(\gamma)}{A(\gamma)}$$

The neutron dose $D_n$ is calculated from the difference between signals behind HDPE, Q(n+γ) and PTFE, Q(γ) and the fast neutron sensitivity factor, B(n) obtained during calibration:

$$D_n = \frac{Q(n+\gamma) - Q(\gamma)}{B(n)}$$

The total dose is calculated by the sum of the gamma dose and neutron dose.

Example 4

Determining the median energy of AmBe neutrons using ratio of two parameters. The aluminum oxide fluorescent nuclear track detectors covered by HDPE are first irradiated in monoenergetic neutron fields for calibration. The acquisition of fluorescence images at different depths in the crystal is performed using the readout apparatus schematically depicted in FIG. 4 and described above in the application. The FFT and dosimetric parameter, power spectrum integral, is calculated for each of the neutron energies and each depth of scanning. The depth profile of the power spectrum integral is plotted and the depth at which the parameter reduces e times is calculated. This depth parameter is then plotted as a function of neutron energy (FIG. 16) and the obtained dependence is used as a calibration curve.

Similar aluminum oxide detectors with polyethylene converters are irradiated with broad spectrum fast neutrons from the AmBe source and the depth profile of the power spectrum integral and 1/e depth are obtained. The calibration curve of FIG. 16 and 1/e depth obtained for bare AmBe irradiation is used to estimate the median energy of AmBe neutrons. According to data from FIG. 16 it is equal to 4.3 MeV. Actual median energy of AmBe field is 4.5 MeV that illustrates a satisfactory performance of the described method.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

It is important to emphasize that the invention is not limited in its application to the detail of the particular material and technological steps illustrated herein. The invention is capable of other embodiments and of being practiced or carried out in a variety of ways. It is to be understood that the phraseology and terminology employed herein is for the purpose of description and not of limitation.

While the present invention has been disclosed with references to certain embodiments, numerous modification, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

Example 5

Figure 20:
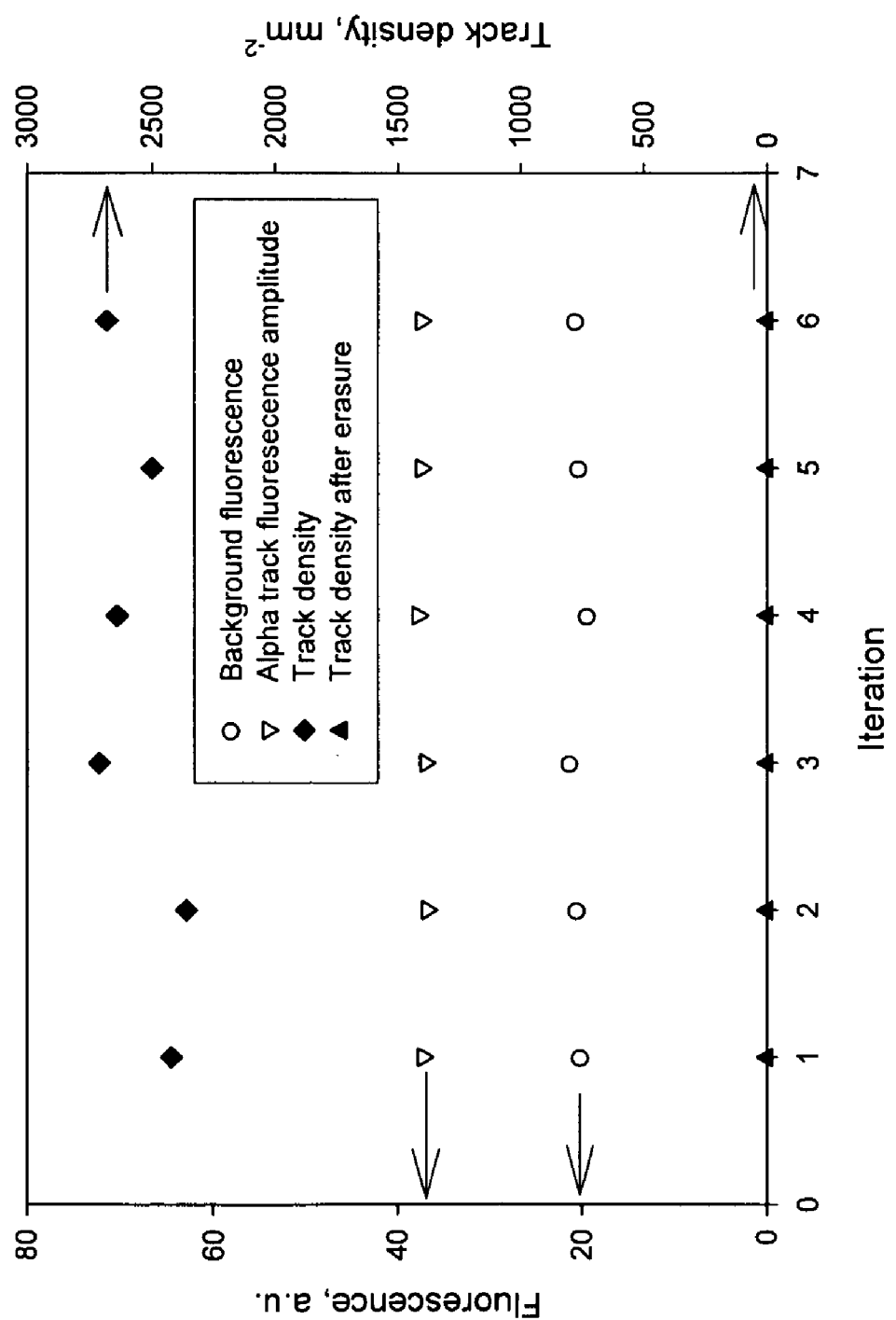
FIG. 20 is a graph showing the ability to erase radiation-induced fluorescence signal and reuse $Al_2O_3$:C,Mg detectors demonstrated by six iterations of irradiation, readout, optical erasure, and control readout after erasue, all performed on the same detector.

Optically erasing radiation-induced fluorescence from the aluminum oxide nuclear track detectors. The fluorescent nuclear track detector is first irradiated with 5.1 MeV alpha particles from a $^{241}$Am source. High spatial resolution fluorescence images are acquired using the readout apparatus depicted in FIG. 4 and described above. Image processing is performed, tracks are counted, the average fluorescence amplitude from radiation induced tracks and background fluorescence signal are obtained. The aluminum oxide fluorescent nuclear track detector is then optically erased using pulsed 325 nm laser light generated by an optical parametric oscillator. The procedure of irradiation, image acquisition, optical erasure and control imaging after erasure is repeated six times. The recorded number of tracks after irradiation and after optical erasure, fluorescence track amplitude and background fluorescence signal are plotted in FIG. 20 as a function of a performed procedure iteration number. After each optical erasure the detector is scanned and no measureable fluorescence tracks are detected, where as the amplitude of radiation-induced tracks is reproducible within statistical uncertainty of the measurements. The results demonstrate the ability of the proposed method to fully erase and reuse the detectors.

What is claimed is:
1. A method comprising the following steps:
   (a) providing one or more respective values of one or more respective dosimetric parameters for a luminescent material irradiated with one or more radiations; and
   (b) determining an absorbed dose for the one or more radiations based on the respective values of the one or more respective dosimetric parameters, wherein the one or more dosimetric parameters are each based on a spatial frequency domain analysis of one or more high spatial resolution fluorescence images of the luminescent material, and wherein at least one of the one or more respective dosimetric values is the value of a power spectrum integral for one high spatial resolution fluorescence image of the one or more high spatial resolution fluorescence images of the luminescent material.

2. The method of claim 1, further comprising the following step:
   (c) determining the value of each of the one or more dosimetric parameters based on the spatial frequency domain analysis of the one or more high spatial resolution fluorescence images of the luminescent material.

3. The method of claim 2, further comprising the following steps:
   (d) exposing the luminescent material to one or more radiations;
   (e) measuring one or more spatial distributions of fluorescence for the luminescent material after conducting step (d); and
   (f) forming a high spatial resolution fluorescence image of the luminescent material based on each spatial distribution of fluorescence measured in step (e).

4. The method of claim 3, wherein step (d) is performed with the particles of known type, energy and angle of incidence.

5. The method of claim 3, wherein step (e) is performed using a method of laser scanning confocal fluorescence microscopy.

6. The method of claim 3, wherein step (e) is performed with a dosimetric instrument that has been previously calibrated by obtaining values for each of the one or more dosimetric parameters.

7. The method of claim 1, wherein each high spatial resolution fluorescence image is two-dimensional.

8. The method of claim 1, wherein each high spatial resolution fluorescence image is three-dimensional.

9. The method of claim 1, wherein the one or more radiations comprises one or more members of the group consisting of: low energy photons, high energy photons, high energy electrons, beta particles, positrons, fast neutrons, moderated neutrons, epithermal neutrons, thermal neutrons, alpha particles, protons, pions, heavy charged particles, and nuclear fragments.

10. The method of claim 1, wherein the one or more radiations comprises recoil protons produced by fast neutrons in a converter covering a portion of the luminescent material and wherein the converter comprises a hydrogen-containing material.

11. The method of claim 1, wherein the one or more radiations comprise alpha particles and/or tritium ions produced by nuclear reaction of neutrons with a converter covering a portion of the luminescent material and wherein the converter comprises isotopes with a high capture cross-section of thermal, epithermal or moderated neutrons.

12. The method of claim 1, wherein the luminescent material is inorganic.

13. The method of claim 12, wherein the luminescent material comprises an inorganic glass.

14. The method of claim 13, wherein the luminescent material comprises an alumophosphate glass doped with silver.

15. The method of claim 12, wherein the luminescent material comprises a crystalline metal oxide.

16. The method of claim 15, wherein the crystalline metal oxide comprises one or more oxygen vacancy defects.

17. The method of claim 16, wherein the crystalline metal oxide comprises $Al_2O_3$.

18. The method of claim 17, wherein the luminescent material further comprises magnesium.

19. The method of claim 18, wherein the luminescent material further comprises carbon.

20. The method of claim 19, wherein the fluorescence from the excited luminescent material has a wavelength centered at 750±60 nm.

21. The method of claim 1, wherein the luminescent material is organic.

22. The method of claim 1, wherein one or more portions of the luminescent material are each covered by a respective converter during the irradiation with the one or more radiations.

23. The method of claim 22, wherein the one or more radiations comprise high energy photons and wherein a portion of the luminescent material is covered by a converter comprising a non-hydrogen-containing material.

24. The method of claim 23, wherein the converter comprises polytetrafluoroethylene.

25. The method of claim 22, wherein the one or more radiations comprise fast neutrons and wherein a portion of the luminescent material is covered by a converter comprising a hydrogen-containing material.

26. The method of claim 25, wherein the converter comprises high density polyethylene.

27. The method of claim 22, wherein the one or more radiations comprise moderated neutrons and wherein a portion of the luminescent material is covered by a converter comprising a $^6Li$ isotope.

28. The method of claim 27, wherein the converter comprises lithium fluoride.

29. The method of claim 22, wherein the one or more radiations comprise moderated neutrons and wherein a portion of the luminescent material is covered by a converter comprising $^{10}B$ isotope.

30. The method of claim 29, wherein the converter comprises polytetrafluoroethylene loaded with boron oxide.

31. The method of claim 1, wherein the method comprises applying one or more transforms to the one high spatial resolution fluorescence image.

32. The method of claim 31, wherein the method comprises applying a Fourier transform to the one high spatial resolution fluorescence image.

33. The method of claim 32, wherein the method comprises the following steps:
    (d) applying a fast Fourier transform to the one high spatial resolution fluorescence image;
    (e) determining a power spectrum of the Fourier transform;
    (f) determining the value of the power spectrum integral for the one high spatial resolution fluorescence image by obtaining an integral of the power spectrum for the one high spatial resolution fluorescence image over a selected range of frequencies.

34. The method of claim 1, wherein each of the dosimetric parameters is based on combining a frequency domain analysis with a spatial domain analysis.

35. A method comprising the following steps:
    (a) providing a first dosimetric parameter for a first type of radiation for a portion of an irradiated luminescent material covered by a first converter; and
    (b) providing a second dosimetric parameter for a combination of the first type of radiation and a second type of radiation for a portion of the irradiated luminescent material covered by a second converter;
    (c) determining an absorbed dose of the first type of radiation based on the value of the first dosimetric parameter; and
    (d) determining an absorbed dose of the second type of radiation based on the values of both the first and second dosimetric parameters;
    wherein the luminescent material is irradiated with the first and second type of radiations prior to steps (a) and (b); and
    wherein the first and second dosimetric parameters are each based on a spatial frequency domain analysis of one or more high spatial resolution fluorescence images of the irradiated luminescent material.

36. The method of claim 35, wherein the first type of radiation comprises high energy photons and wherein the first converter comprises a non-hydrogen-containing material.

37. The method of claim 35, wherein the second type of radiation comprises fast neutrons and wherein the second converter comprises a hydrogen-containing material.

38. The method of claim 35, wherein the second type of radiation comprises moderated neutrons and wherein the second converter comprises a $^6Li$ isotope.

39. The method of claim 35, wherein the second type of radiation comprises moderated neutrons and wherein the second converter comprises a $^{10}B$ isotope.

* * * * *